(12) United States Patent
Suzuki et al.

(10) Patent No.: US 8,997,472 B2
(45) Date of Patent: Apr. 7, 2015

(54) ABNORMALITY DETECTING DEVICE FOR CONSTRUCTION MACHINE

(75) Inventors: Hideaki Suzuki, Hitachi (JP); Yoshinori Furuno, Tsuchiura (JP); Jun Nishihata, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 818 days.

(21) Appl. No.: 13/201,875

(22) PCT Filed: Mar. 3, 2010

(86) PCT No.: PCT/JP2010/053470
§ 371 (c)(1),
(2), (4) Date: Oct. 27, 2011

(87) PCT Pub. No.: WO2010/110021
PCT Pub. Date: Sep. 30, 2010

(65) Prior Publication Data
US 2012/0041663 A1 Feb. 16, 2012

(30) Foreign Application Priority Data
Mar. 24, 2009 (JP) .................................. 2009-071120

(51) Int. Cl.
*F16D 31/00* (2006.01)
*F04B 49/10* (2006.01)
*E02F 9/26* (2006.01)
*G05B 23/02* (2006.01)

(52) U.S. Cl.
CPC . *F04B 49/10* (2013.01); *E02F 9/26* (2013.01); *E02F 9/267* (2013.01); *G05B 23/024* (2013.01); *F04B 2201/1201* (2013.01); *F04B 2203/0209* (2013.01); *F04B 2205/03* (2013.01); *F04B 2205/05* (2013.01); *F04B 2205/11* (2013.01); *F04B 2207/03* (2013.01)

(58) Field of Classification Search
USPC .......... 706/15, 16, 19, 45; 703/2; 60/328, 399
See application file for complete search history.

(56) References Cited

U.S. PATENT DOCUMENTS 3,242,321 A * 3/1966 Chope ........................... 702/185
4,489,551 A * 12/1984 Watanabe et al. ............... 60/328

(Continued)

FOREIGN PATENT DOCUMENTS

| JP | 59-77514 | 5/1984 |
|----|----------|--------|
| JP | 62-228920 | 10/1987 |

(Continued)

*Primary Examiner* — Thomas Moulis
*Assistant Examiner* — Joseph Dallo
(74) *Attorney, Agent, or Firm* — Baker Botts L.L.P.

(57) ABSTRACT

Provided is an abnormality detecting device for a construction machine that can estimate an abnormality occurring to a component (engine, pump, etc.) of the construction machine based on the relationship among a plurality of pieces of sensor information and thereby prevent machine failure. A correlation coefficient calculation unit 102 calculates correlation coefficients between time-series sensor values acquired by a plurality of sensors 101. A correlation coefficient comparison unit 103 compares the correlation coefficients and calculates the degree of difference between each correlation coefficient and other correlation coefficients. An abnormality judgment unit 104 judges that an abnormality has occurred to a part related to a sensor when the degree of difference calculated in regard to the sensor exceeds a preset value.

13 Claims, 29 Drawing Sheets

(56) References Cited

U.S. PATENT DOCUMENTS

| | | | |
|---|---|---|---|
| 5,680,409 A | 10/1997 | Qin et al. | |
| 6,983,207 B2* | 1/2006 | Gotou et al. | 702/35 |
| 7,464,063 B2* | 12/2008 | Vatchkov et al. | 706/45 |
| 7,478,489 B2* | 1/2009 | Anderson et al. | 37/348 |
| 7,543,447 B2* | 6/2009 | Itoga et al. | 60/431 |
| 7,676,338 B2* | 3/2010 | Sato | 702/99 |
| 7,743,005 B2* | 6/2010 | Vatchkov et al. | 706/16 |
| 7,766,541 B2* | 8/2010 | Sato | 374/1 |
| 7,953,559 B2* | 5/2011 | Sundermeyer et al. | 702/33 |
| 2007/0213855 A1* | 9/2007 | Furuno et al. | 700/83 |
| 2007/0244841 A1* | 10/2007 | Vatchkov et al. | 706/16 |
| 2008/0136402 A1* | 6/2008 | Sato | 324/105 |
| 2008/0144693 A1* | 6/2008 | Sato | 374/1 |
| 2009/0171594 A1* | 7/2009 | Norihisa | 702/34 |
| 2012/0317966 A1* | 12/2012 | Mueller et al. | 60/328 |

FOREIGN PATENT DOCUMENTS

| | | | | |
|---|---|---|---|---|
| JP | 3-290046 | | 12/1991 | |
| JP | 05162000 A | * | 6/1993 | B30B 15/28 |
| JP | 06139479 A | * | 5/1994 | G08B 23/00 |
| JP | 8-320726 | | 12/1996 | |
| JP | 11-510898 | | 9/1999 | |
| JP | 2000-298511 | | 10/2000 | |
| JP | 2001182535 A | * | 7/2001 | F01P 7/04 |
| JP | 2006-144292 | | 6/2006 | |
| JP | 2007-241572 | | 9/2007 | |
| JP | 2008196165 A | * | 8/2008 | |

* cited by examiner

FIG. 6

|     | #1   | #2   | #3   | #4   | #5   |
|-----|------|------|------|------|------|
| #1  | 1.00 | 0.88 | 0.94 | 0.83 | 0.85 |
| #2  | 0.88 | 1.00 | 0.87 | 0.82 | 0.85 |
| #3  | 0.94 | 0.87 | 1.00 | 0.85 | 0.84 |
| #4  | 0.83 | 0.82 | 0.85 | 1.00 | 0.86 |
| #5  | 0.85 | 0.85 | 0.84 | 0.86 | 1.00 |

|  | #1 | #2 | #3 | #4 | #5 |
|---|---|---|---|---|---|
| #1 | 1.44 | −0.29 | 0.57 | −1.01 | −0.72 |
| #2 | −0.06 | 1.69 | −0.20 | −0.93 | −0.49 |
| #3 | 0.59 | −0.44 | 1.47 | −0.73 | −0.88 |
| #4 | −0.57 | −0.71 | −0.30 | 1.75 | −0.16 |
| #5 | −0.44 | −0.44 | −0.59 | −0.30 | 1.78 |

|     | #1 | #2  | #3 | #4  | #5  |
|-----|----|-----|----|-----|-----|
| #1  | 0  | 0   | 0  | 0   | 0   |
| #2  | 0  | 0.5 | 0  | 0   | 0   |
| #3  | 0  | 0   | 0  | 0   | 0   |
| #4  | 0  | 0   | 0  | 0.5 | 0   |
| #5  | 0  | 0   | 0  | 0   | 0.5 |

~801

|       | #1 | #2  | #3 | #4  | #5  |
|-------|----|-----|----|-----|-----|
| TOTAL | 0  | 0.5 | 0  | 0.5 | 0.5 |
|       | 0% | 10% | 0% | 10% | 10% |

|    | #1   | #2   | #3   | #4   | #5   |
|----|------|------|------|------|------|
| #1 | 1.00 | 0.88 | 0.15 | 0.89 | 0.88 |
| #2 | 0.88 | 1.00 | 0.15 | 0.87 | 0.88 |
| #3 | 0.15 | 0.15 | 1.00 | 0.15 | 0.15 |
| #4 | 0.89 | 0.87 | 0.15 | 1.00 | 0.90 |
| #5 | 0.88 | 0.88 | 0.15 | 0.90 | 1.00 |

|    | #1    | #2    | #3    | #4    | #5    |
|----|-------|-------|-------|-------|-------|
| #1 | 0.70  | 0.35  | −1.77 | 0.38  | 0.35  |
| #2 | 0.36  | 0.71  | −1.77 | 0.33  | 0.36  |
| #3 | −0.45 | −0.45 | 1.79  | −0.45 | −0.45 |
| #4 | 0.37  | 0.31  | −1.77 | 0.69  | 0.40  |
| #5 | 0.34  | 0.34  | −1.77 | 0.40  | 0.69  |

|  | #1 | #2 | #3 | #4 | #5 |
|---|---|---|---|---|---|
| #1 | 0 | 0 | 0.5 | 0 | 0 |
| #2 | 0 | 0 | 0.5 | 0 | 0 |
| #3 | 0 | 0 | 0.5 | 0 | 0 |
| #4 | 0 | 0 | 0.5 | 0 | 0 |
| #5 | 0 | 0 | 0.5 | 0 | 0 |

~1201

|  | #1 | #2 | #3 | #4 | #5 |
|---|---|---|---|---|---|
| TOTAL | 0 | 0 | +2.5 | 0 | 0 |
|  | 0% | 0% | 50% | 0% | 0% |

· CHECK USING CORRELATION

|     | #1   | #2   | #3   | #4   | #5   | #6   | #7   | #8   | #9   | #10  | #11  | #12  | #13  | #14  | #15  | #16  |
|-----|------|------|------|------|------|------|------|------|------|------|------|------|------|------|------|------|
| #1  | 1.00 | 1.00 | 0.99 | 0.95 | 1.00 | 1.00 | 1.00 | 1.00 | 0.92 | 1.00 | 1.00 | 1.00 | 1.00 | 1.00 | 0.99 | 1.00 |
| #2  | 1.00 | 1.00 | 0.99 | 0.95 | 1.00 | 0.99 | 1.00 | 1.00 | 0.90 | 1.00 | 1.00 | 0.99 | 0.99 | 1.00 | 0.99 | 1.00 |
| #3  | 0.99 | 0.99 | 1.00 | 0.94 | 0.99 | 0.99 | 0.99 | 1.00 | 0.92 | 0.99 | 0.99 | 1.00 | 0.99 | 0.99 | 0.99 | 0.99 |
| #4  | 0.95 | 0.94 | 0.95 | 1.00 | 0.95 | 0.97 | 0.96 | 0.96 | 0.99 | 0.97 | 0.94 | 0.96 | 0.96 | 0.95 | 0.97 | 0.96 |
| #5  | 1.00 | 1.00 | 0.99 | 0.95 | 1.00 | 1.00 | 1.00 | 1.00 | 0.91 | 1.00 | 1.00 | 1.00 | 1.00 | 1.00 | 0.99 | 1.00 |
| #6  | 1.00 | 0.99 | 0.99 | 0.97 | 1.00 | 1.00 | 1.00 | 1.00 | 0.94 | 1.00 | 0.99 | 1.00 | 1.00 | 1.00 | 1.00 | 1.00 |
| #7  | 1.00 | 1.00 | 0.99 | 0.96 | 1.00 | 1.00 | 1.00 | 1.00 | 0.93 | 1.00 | 1.00 | 1.00 | 1.00 | 1.00 | 1.00 | 1.00 |
| #8  | 1.00 | 1.00 | 1.00 | 0.96 | 1.00 | 1.00 | 1.00 | 1.00 | 0.92 | 1.00 | 1.00 | 1.00 | 1.00 | 1.00 | 1.00 | 1.00 |
| #9  | 0.92 | 0.90 | 0.92 | 0.99 | 0.91 | 0.94 | 0.93 | 0.92 | 1.00 | 0.94 | 0.90 | 0.93 | 0.93 | 0.91 | 0.95 | 0.92 |
| #10 | 1.00 | 1.00 | 0.99 | 0.97 | 1.00 | 1.00 | 1.00 | 1.00 | 0.94 | 1.00 | 0.99 | 1.00 | 1.00 | 1.00 | 1.00 | 1.00 |
| #11 | 1.00 | 1.00 | 0.99 | 0.94 | 1.00 | 0.99 | 1.00 | 1.00 | 0.90 | 0.99 | 1.00 | 0.99 | 1.00 | 1.00 | 0.99 | 1.00 |
| #12 | 1.00 | 0.99 | 1.00 | 0.96 | 1.00 | 1.00 | 1.00 | 1.00 | 0.93 | 1.00 | 0.99 | 1.00 | 1.00 | 1.00 | 1.00 | 1.00 |
| #13 | 1.00 | 0.99 | 0.99 | 0.96 | 1.00 | 1.00 | 1.00 | 1.00 | 0.93 | 1.00 | 1.00 | 1.00 | 1.00 | 1.00 | 1.00 | 1.00 |
| #14 | 1.00 | 1.00 | 0.99 | 0.95 | 1.00 | 1.00 | 1.00 | 1.00 | 0.91 | 1.00 | 1.00 | 1.00 | 1.00 | 1.00 | 0.99 | 1.00 |
| #15 | 0.99 | 0.99 | 0.99 | 0.97 | 0.99 | 1.00 | 1.00 | 1.00 | 0.95 | 1.00 | 0.99 | 1.00 | 1.00 | 0.99 | 1.00 | 1.00 |
| #16 | 1.00 | 1.00 | 0.99 | 0.96 | 1.00 | 1.00 | 1.00 | 1.00 | 0.92 | 1.00 | 1.00 | 1.00 | 1.00 | 1.00 | 1.00 | 1.00 |

FIG. 17

| | #1 | #2 | #3 | #4 | #5 | #6 | #7 | #8 | #9 | #10 | #11 | #12 | #13 | #14 | #15 | #16 | | |
|---|---|---|---|---|---|---|---|---|---|---|---|---|---|---|---|---|---|---|
| #1 | 0 | 0 | 0 | 0.5 | 0 | 0 | 0 | 0 | 1 | 0 | 0 | 0 | 0 | 0 | 0 | 0 | 0 | 0% |
| #2 | 0 | 0 | 0 | 0.5 | 0 | 0 | 0 | 0 | 1 | 0 | 0 | 0 | 0 | 0 | 0 | 0 | 0 | 0% |
| #3 | 0 | 0 | 0 | 0.5 | 0 | 0 | 0 | 0 | 1 | 0 | 0 | 0 | 0 | 0 | 0 | 0 | 0 | 0% |
| #4 | 0 | 0 | 0 | 0.5 | 0 | 0 | 0 | 0 | 0.5 | 0 | 0 | 0 | 0 | 0 | 0 | 0 | 0 | 0% |
| #5 | 0 | 0 | 0 | 0.5 | 0 | 0 | 0 | 0 | 1 | 0 | 0 | 0 | 0 | 0 | 0 | 0 | 0 | 0% |
| #6 | 0 | 0 | 0 | 0 | 0 | 0 | 0 | 0 | 1 | 0 | 0 | 0 | 0 | 0 | 0 | 0 | 0 | 0% |
| #7 | 0 | 0 | 0 | 0.5 | 0 | 0 | 0 | 0 | 1 | 0 | 0 | 0 | 0 | 0 | 0 | 0 | 0 | 0% |
| #8 | 0 | 0 | 0 | 0.5 | 0 | 0 | 0 | 0 | 1 | 0 | 0 | 0 | 0 | 0 | 0 | 0 | 0 | 0% |
| #9 | 0 | 0 | 0 | 0 | 0 | 0 | 0 | 0 | 0.5 | 0 | 0 | 0 | 0 | 0 | 0 | 0 | 0 | 0% |
| #10 | 0 | 0 | 0 | 0.5 | 0 | 0 | 0 | 0 | 1 | 0 | 0 | 0 | 0 | 0 | 0 | 0 | 0 | 0% |
| #11 | 0 | 0 | 0 | 0.5 | 0 | 0 | 0 | 0 | 1 | 0 | 0 | 0 | 0 | 0 | 0 | 0 | 0 | 0% |
| #12 | 0 | 0 | 0 | 0.5 | 0 | 0 | 0 | 0 | 1 | 0 | 0 | 0 | 0 | 0 | 0 | 0 | 0 | 0% |
| #13 | 0 | 0 | 0 | 0.5 | 0 | 0 | 0 | 0 | 1 | 0 | 0 | 0 | 0 | 0 | 0 | 0 | 0 | 0% |
| #14 | 0 | 0 | 0 | 0 | 0 | 0 | 0 | 0 | 1 | 0 | 0 | 0 | 0 | 0 | 0 | 0 | 0 | 0% |
| #15 | 0 | 0 | 0 | 0.5 | 0 | 0 | 0 | 0 | 1 | 0 | 0 | 0 | 0 | 0 | 0 | 0 | 0 | 0% |
| | 0 | 0 | 0 | 7 | 0 | 0 | 0 | 0 | 15 | 0 | 0 | 0 | 0 | 0 | 0 | 0 | | |
| | 0% | 0% | 0% | 41% | 0% | 0% | 0% | 0% | 94% | 0% | 0% | 0% | 0% | 0% | 0% | 0% | | |

FIG. 20

- CHECK USING RATIO BETWEEN VALUES

|     | #1   | #2   | #3   | #4   | #5   | #6   | #7   | #8   | #9   | #10  | #11  | #12  | #13  | #14  | #15  | #16  |
|-----|------|------|------|------|------|------|------|------|------|------|------|------|------|------|------|------|
| #1  | 1.00 | 1.02 | 1.37 | 1.01 | 0.93 | 1.02 | 0.94 | 1.03 | 1.06 | 1.01 | 1.02 | 1.06 | 0.98 | 1.06 | 1.01 | 0.92 |
| #2  | 0.98 | 1.00 | 1.34 | 1.00 | 0.91 | 1.00 | 0.92 | 1.01 | 1.04 | 0.99 | 1.00 | 1.04 | 0.96 | 1.03 | 0.99 | 0.90 |
| #3  | 0.73 | 0.75 | 1.00 | 0.75 | 0.68 | 0.75 | 0.69 | 0.75 | 0.78 | 0.74 | 0.75 | 0.78 | 0.72 | 0.77 | 0.74 | 0.67 |
| #4  | 1.01 | 1.03 | 1.38 | 1.00 | 0.94 | 1.02 | 0.94 | 1.03 | 1.03 | 1.02 | 1.02 | 1.06 | 0.98 | 1.06 | 1.00 | 0.92 |
| #5  | 1.07 | 1.10 | 1.47 | 1.09 | 1.00 | 1.10 | 1.01 | 1.10 | 1.13 | 1.09 | 1.09 | 1.13 | 1.05 | 1.13 | 1.08 | 0.98 |
| #6  | 0.98 | 1.00 | 1.34 | 0.99 | 0.91 | 1.00 | 0.92 | 1.01 | 1.03 | 0.99 | 1.00 | 1.04 | 0.96 | 1.03 | 0.98 | 0.90 |
| #7  | 1.07 | 1.09 | 1.46 | 1.07 | 1.00 | 1.09 | 1.00 | 1.10 | 1.12 | 1.08 | 1.08 | 1.13 | 1.04 | 1.13 | 1.07 | 0.98 |
| #8  | 0.97 | 0.99 | 1.33 | 0.98 | 0.91 | 0.99 | 0.91 | 1.00 | 1.02 | 0.99 | 0.99 | 1.03 | 0.95 | 1.03 | 0.98 | 0.89 |
| #9  | 0.98 | 1.00 | 1.34 | 0.97 | 0.91 | 0.99 | 0.91 | 1.01 | 1.00 | 0.99 | 0.99 | 1.03 | 0.95 | 1.03 | 0.97 | 0.89 |
| #10 | 0.99 | 1.01 | 1.35 | 1.00 | 0.92 | 1.01 | 0.93 | 1.02 | 1.04 | 1.00 | 1.00 | 1.04 | 0.97 | 1.04 | 0.99 | 0.90 |
| #11 | 0.98 | 1.01 | 1.35 | 1.00 | 0.92 | 1.01 | 0.92 | 1.01 | 1.04 | 1.00 | 1.00 | 1.04 | 0.96 | 1.04 | 0.99 | 0.90 |
| #12 | 0.95 | 0.97 | 1.30 | 0.95 | 0.88 | 0.97 | 0.89 | 0.97 | 0.99 | 0.96 | 0.96 | 1.00 | 0.92 | 1.00 | 0.95 | 0.87 |
| #13 | 1.02 | 1.05 | 1.40 | 1.03 | 0.95 | 1.04 | 0.96 | 1.05 | 1.07 | 1.04 | 1.04 | 1.08 | 1.00 | 1.08 | 1.03 | 0.94 |
| #14 | 0.95 | 0.97 | 1.30 | 0.96 | 0.88 | 0.97 | 0.89 | 0.97 | 1.00 | 0.96 | 0.96 | 1.00 | 0.93 | 1.00 | 0.95 | 0.87 |
| #15 | 1.00 | 1.02 | 1.37 | 1.00 | 0.93 | 1.02 | 0.94 | 1.03 | 1.04 | 1.01 | 1.02 | 1.06 | 0.98 | 1.06 | 1.00 | 0.92 |
| #16 | 1.09 | 1.12 | 1.49 | 1.11 | 1.02 | 1.12 | 1.03 | 1.12 | 1.15 | 1.11 | 1.11 | 1.16 | 1.07 | 1.15 | 1.10 | 1.00 |

FIG. 21

|    | #1 | #2 | #3 | #4 | #5 | #6 | #7 | #8 | #9 | #10 | #11 | #12 | #13 | #14 | #15 | #16 |     |      |
|----|----|----|----|----|----|----|----|----|----|-----|-----|-----|-----|-----|-----|-----|-----|------|
| #1 | 0  | 0  | 1  | 0  | 0  | 0  | 0  | 0  | 0  | 0   | 0   | 0   | 0   | 0   | 0   | 0   |     |      |
| #2 | 0  | 0  | 1  | 0  | 0  | 0  | 0  | 0  | 0  | 0   | 0   | 0   | 0   | 0   | 0   | 0   |     |      |
| #3 | 0  | 0  | 1  | 0  | 0  | 0  | 0  | 0  | 0  | 0   | 0   | 0   | 0   | 0   | 0   | 0   |     |      |
| #4 | 0  | 0  | 1  | 0  | 0  | 0  | 0  | 0  | 0  | 0   | 0   | 0   | 0   | 0   | 0   | 0   |     |      |
| #5 | 0  | 0  | 1  | 0  | 0  | 0  | 0  | 0  | 0  | 0   | 0   | 0   | 0   | 0   | 0   | 0   |     |      |
| #6 | 0  | 0  | 1  | 0  | 0  | 0  | 0  | 0  | 0  | 0   | 0   | 0   | 0   | 0   | 0   | 0   |     |      |
| #7 | 0  | 0  | 1  | 0  | 0  | 0  | 0  | 0  | 0  | 0   | 0   | 0   | 0   | 0   | 0   | 0   |     |      |
| #8 | 0  | 0  | 1  | 0  | 0  | 0  | 0  | 0  | 0  | 0   | 0   | 0   | 0   | 0   | 0   | 0   |     |      |
| #9 | 0  | 0  | 1  | 0  | 0  | 0  | 0  | 0  | 0  | 0   | 0   | 0   | 0   | 0   | 0   | 0   |     |      |
| #10| 0  | 0  | 1  | 0  | 0  | 0  | 0  | 0  | 0  | 0   | 0   | 0   | 0   | 0   | 0   | 0   |     |      |
| #11| 0  | 0  | 1  | 0  | 0  | 0  | 0  | 0  | 0  | 0   | 0   | 0   | 0   | 0   | 0   | 0   |     |      |
| #12| 0  | 0  | 1  | 0  | 0  | 0  | 0  | 0  | 0  | 0   | 0   | 0   | 0   | 0   | 0   | 0   |     |      |
| #13| 0  | 0  | 1  | 0  | 0  | 0  | 0  | 0  | 0  | 0   | 0   | 0   | 0   | 0   | 0   | 0   |     |      |
| #14| 0  | 0  | 1  | 0  | 0  | 0  | 0  | 0  | 0  | 0   | 0   | 0   | 0   | 0   | 0   | 0   |     |      |
| #15| 0  | 0  | 1  | 0  | 0  | 0  | 0  | 0  | 0  | 0   | 0   | 0   | 0   | 0   | 0   | 0   |     |      |
| #16| 0  | 0  | 1  | 0  | 0  | 0  | 0  | 0  | 0  | 0   | 0   | 0   | 0   | 0   | 0   | 0   |     |      |
|    | 0  | 0  | 16 | 0  | 0  | 0  | 0  | 0  | 0  | 0   | 0   | 0   | 0   | 0   | 0   | 0   |     |      |
|    | 0% | 0% |100%| 0% | 0% | 0% | 0% | 0% | 0% | 0%  | 0%  | 0%  | 0%  | 0%  | 0%  | 0%  |     |      |

ABNORMALITY DETECTING DEVICE FOR CONSTRUCTION MACHINE

TECHNICAL FIELD

The present invention relates to an abnormality detecting device for detecting an abnormality in a construction machine such as a hydraulic shovel.

BACKGROUND Art

Some of construction machines (e.g., large hydraulic shovels) operating in mines, etc. are required to operate 24 hours a day almost without stopping and 365 days a year consecutively. Such a construction machine has to be kept in perfect condition by previously doing maintenance such that the machine does not stop due to an abnormality. In general, a specialized maintenance personnel periodically conducts inspection to check whether or not there exists an abnormal part. When an abnormality is found, necessary maintenance work is conducted to the machine, by which satisfactory machine conditions are maintained. However, it is necessary to stop each machine in order to carry out the check and maintenance. Thus, for an operator who wants to make machines operate continuously, the check and maintenance work would be cumbersome in operation if the machines are kept in fine condition.

Therefore, abnormality diagnosis technologies have developed for measuring conditions of a machine using various sensors and checking whether or not the machine has an abnormality. Preventive maintenance, which prevents machine failure by previously detecting an abnormality by a diagnostic technology before the machine fails or stops and conducting maintenance as countermeasures in early stages, is being regarded as more and more important.

Meanwhile, even though machine manufacturers are energetically developing diagnostic algorithms for the abnormality diagnosis, there are cases where appropriate judgment is impossible as a result of difficulty in the algorithm development. The appropriate judgment is difficult since the experimental environment in which experiments were conducted for the algorithm development differs from the operating environment and operational configurations in which the user actually uses the machine.

In consideration of the above problem, inventions aiming to make a judgment using measurement results in the actual environment have been made. For example, in a technique described in Patent Literature 1, average temperature is calculated as the average of outputs of temperature sensors placed at the cylinders of the engine. When the difference between the temperature of a cylinder and the average temperature reaches a preset value, the cylinder is judged to have failed.

PRIOR ART LITERATURE

Patent Literature

Patent Literature 1: JP-3-290046-A

SUMMARY OF THE INVENTION

Problem to be Solved by the Invention

However, in a machine having a large engine (e.g., hydraulic shovel for use in mines), there can be temperature difference between cylinders depending on the arrangement of the engine cooling mechanism. Further, in recent engine control technology, complicated control, such as stopping either bank of the engine when high power is unnecessary, is conducted in order to reduce the fuel consumption. In such a situation, the use of the average temperature as the reference for the judgment leads to false detection. Moreover, the control of the hydraulic pump, which is executed according to the operation by the operator, requires highly complicated control and an abnormality judgment method different from that for the engine control has to be employed.

The present invention has been made in view of the above problems. It is therefore the primary object of the present invention to provide an abnormality detecting device for a construction machine that can estimate, based on the relationship among a plurality of pieces of sensor information, an abnormality occurring to a component (engine, pump, etc.) of the construction machine and thereby prevent machine failure.

Means for Solving the Problem

In order to achieve the above object, the present invention provides an abnormality detecting device for a construction machine equipped with a plurality of sensor means placed at a plurality of parts of the construction machine, the sensor means detecting a plurality of related physical states and outputting a plurality of pieces of sensor information, comprising: correlation coefficient calculation means which receives the plurality of pieces of sensor information outputted from the plurality of sensor means, generates time-series physical state information in a predetermined period on each of the plurality of pieces of sensor information corresponding to the plurality of sensor means, and calculates a plurality of correlation coefficients between separated pieces of time-series physical state information on each of the plurality of pieces of sensor information; correlation coefficient comparison means which compares the correlation coefficients calculated by the correlation coefficient calculation means and calculates the degree of difference of each correlation coefficient from other correlation coefficients; and abnormality judgment means which judges that when the degree of difference calculated by the correlation coefficient comparison means exceeds a preset value, an abnormality has occurred to a part related to the corresponding sensor means.

Preferably, the plurality of sensor means are three or more sensor means detecting three or more identical physical states as the plurality of related physical states. The correlation coefficient calculation means receives three or more pieces of sensor information outputted from the three or more sensor means, generates three or more pieces of time-series physical state information in the same period for each sensor means and calculates the correlation coefficients from the three or more pieces of time-series physical state information regarding each sensor means.

Preferably, the plurality of sensor means are two or more sensor means detecting correlatively changing two or more physical states as the plurality of related physical states. The correlation coefficient calculation means receives two or more pieces of sensor information outputted from the two or more sensor means in each of three or more different periods, generates three or more pieces of time-series physical state information in the same periods for each sensor means and calculates the correlation coefficients from the three or more pieces of time-series physical state information regarding each sensor means.

Preferably, the correlation coefficient comparison means determines a normalized deviation among the correlation coefficients in regard to each of the correlation coefficients calculated by the correlation coefficient calculation means and calculates the degree of difference based on the normalized deviation.

Preferably, the correlation coefficient comparison means determines a normalized deviation among the correlation coefficients using an average and a standard deviation calculated from the correlation coefficients calculated by the correlation coefficient calculation means, determines a correlation comparative value as an abnormality information flag according to the absolute value of the normalized deviation, and calculates a value representing the degree of difference by totalizing the correlation comparative values.

Preferably, the construction machine is equipped with a plurality of hydraulic pumps. The plurality of sensor means include pressure sensors being placed at the hydraulic pumps, respectively, detecting pressures of the hydraulic pumps and outputting pressure information. When the degree of difference calculated by the correlation coefficient comparison means in regard to a correlation coefficient exceeds a preset value, the abnormality judgment means judges that an abnormality has occurred to a hydraulic pump related to a pressure sensor corresponding to the correlation coefficient.

Preferably, the abnormality detecting device further comprises: operational information detecting means which detects operational information on the construction machine; and hydraulic pump operation judgment means which judges operating status of each hydraulic pump based on the operational information. The correlation coefficient calculation means calculates the correlation coefficients using the pressure information on hydraulic pumps that are in operation only, based on result of the judgment by the operation judgment means.

Preferably, the construction machine is equipped with an engine having a plurality of cylinders. The plurality of sensor means include temperature sensors being placed at the engine's cylinders, respectively, detecting temperatures of the cylinders and outputting temperature information. When the degree of difference calculated by the correlation coefficient comparison means in regard to a temperature sensor exceeds a preset value, the abnormality judgment means judges that an abnormality has occurred to a cylinder related to the temperature sensor.

Preferably, the abnormality detecting device further comprises revolution speed detecting means which detects engine revolution speed of the engine. The correlation coefficient calculation means calculates the correlation coefficients using the temperature information acquired only when the engine revolution speed detected by the revolution speed detecting means is a predetermined value or more.

Preferably, the construction machine includes: an engine; a hydraulic pump which is driven by the engine, pumps hydraulic oil up from a tank and discharges the hydraulic oil; a hydraulic actuator which is driven by the hydraulic oil discharged from the hydraulic pump and supplied via a control valve; and a hydraulic oil cooling device which cools down the hydraulic oil being returned from the hydraulic actuator to the tank via the control valve. The hydraulic oil cooling device includes: a hydraulic oil cooler which is placed on a path returning the hydraulic oil to the tank and cools down the hydraulic oil; and a cooling fan which cools down the hydraulic oil cooler. The plurality of sensor means include: a first temperature sensor which detects outside air temperature; a second temperature sensor which detects temperature of the hydraulic oil in the tank; a third temperature sensor which detects temperature of the hydraulic oil on the inlet side of the hydraulic oil cooler; and a fourth temperature sensor which detects temperature of the hydraulic oil on the outlet side of the hydraulic oil cooler. When the degree of difference calculated by the correlation coefficient comparison means in regard to a temperature sensor exceeds a preset value, the abnormality judgment means judges that an abnormality has occurred to a part of the hydraulic oil cooling device related to the temperature sensor.

Preferably, the construction machine includes: an engine; an engine oil cooling system including an oil pump which is driven by the engine, pumps engine oil up from an oil pan, discharges the engine oil and circulates the engine oil in the engine, and an oil cooler which is placed on a path returning the engine oil after circulating in the engine to the oil pan and cools down the hydraulic oil; and a coolant cooling system including a water jacket which cools the oil cooler, a water pump which is driven by the engine and supplies coolant to the water jacket, a radiator which is placed on a path returning the coolant after passing through the water jacket to the water pump and cools down the coolant, and a cooling fan which is driven by the engine and cools down the radiator. The plurality of sensor means include: a revolution speed sensor which detects engine revolution speed of the engine; a first pressure sensor which detects pressure of the engine oil discharged from the oil pump; and a second pressure sensor which detects pressure of the coolant discharged from the water pump. The correlation coefficient calculation means calculates correlation coefficients between each of engine revolution speed information outputted from the revolution speed sensor, first pressure information outputted from the first pressure sensor and second pressure information outputted from the second pressure sensor and other pieces of information. The correlation coefficient comparison means calculates the degrees of difference by comparing the correlation coefficients calculated by the correlation coefficient calculation means. When the degree of difference calculated by the correlation coefficient comparison means in regard to a sensor means exceeds a preset value, the abnormality judgment means judges that an abnormality has occurred to a component related to the sensor means.

Preferably, the construction machine includes the aforementioned engine oil cooling system and the aforementioned coolant cooling system. The plurality of sensor means include a first temperature sensor which detects temperature of the engine oil and a second temperature sensor which detects temperature of the coolant. When the degree of difference calculated by the correlation coefficient comparison means in regard to a temperature sensor exceeds a preset value, the abnormality judgment means judges that an abnormality has occurred to the engine oil cooling system or the coolant cooling system that is related to the temperature sensor.

Preferably, the abnormality detecting device comprises relative ratio calculation means which calculates relative ratios between separated pieces of time-series physical state information in regard to each piece of time-series physical state information regarding each piece of sensor information and relative ratio comparison means which compares the relative ratios calculated by the relative ratio calculation means and calculates the degree of difference between each relative ratio and other relative ratios in place of the correlation coefficient calculation means and the correlation coefficient comparison means. When the degree of difference calculated by the correlation coefficient comparison means in regard to a sensor means exceeds a preset value, the abnormality judgment means judges that an abnormality has occurred to a part related to the sensor means.

Effect of the Invention

The abnormality detecting device in accordance with the present invention conducts the detection of abnormality using comparative information on the correlation coefficients of the plurality of pieces of sensor information acquired from the plurality of sensor means (temperature sensors, pressure sensors, etc.) depending on the control status of each component (engine, hydraulic pump, etc.). This eliminates the need of previously calculating learning values or judgment threshold values corresponding to multiple states of the construction machine from measurement data. Therefore, appropriate judgments can be made on the machine by the same judgment method and failures of the machine can be prevented consistently in a variety of operating environments and operational configurations of the construction machine.

BRIEF DESCRIPTION OF THE DRAWINGS

FIG. 6 is a table showing the result of calculation of correlation coefficients in the normal state in the first embodiment.

FIG. 7 is a table showing normalized deviations corresponding to the correlation coefficients of hydraulic pumps in the first embodiment in the normal state.

FIG. 8 is a table showing the outputs of a correlation coefficient comparison unit in the first embodiment in the normal state.

FIG. 10 is a table showing the result of the calculation of the correlation coefficients when the abnormality has occurred in the first embodiment.

FIG. 11 is a table showing the normalized deviations corresponding to the correlation coefficients when the abnormality has occurred in a hydraulic pump in the first embodiment.

FIG. 12 is a table showing the outputs of the correlation coefficient comparison unit when the abnormality has occurred in the first embodiment.

FIG. 16 is a table showing the result of the calculation of the correlation coefficients when an abnormality has occurred in the third embodiment.

FIG. 17 is a table showing the outputs of the correlation coefficient comparison unit when the abnormality has occurred in the third embodiment.

FIG. 20 is a table showing the result of the calculation of the correlation coefficients when an abnormality has occurred in the fifth embodiment.

FIG. 21 is a table showing the outputs of the correlation coefficient comparison unit when the abnormality has occurred in the fifth embodiment.

MODE FOR CARRYING OUT THE INVENTION

Figure 1:
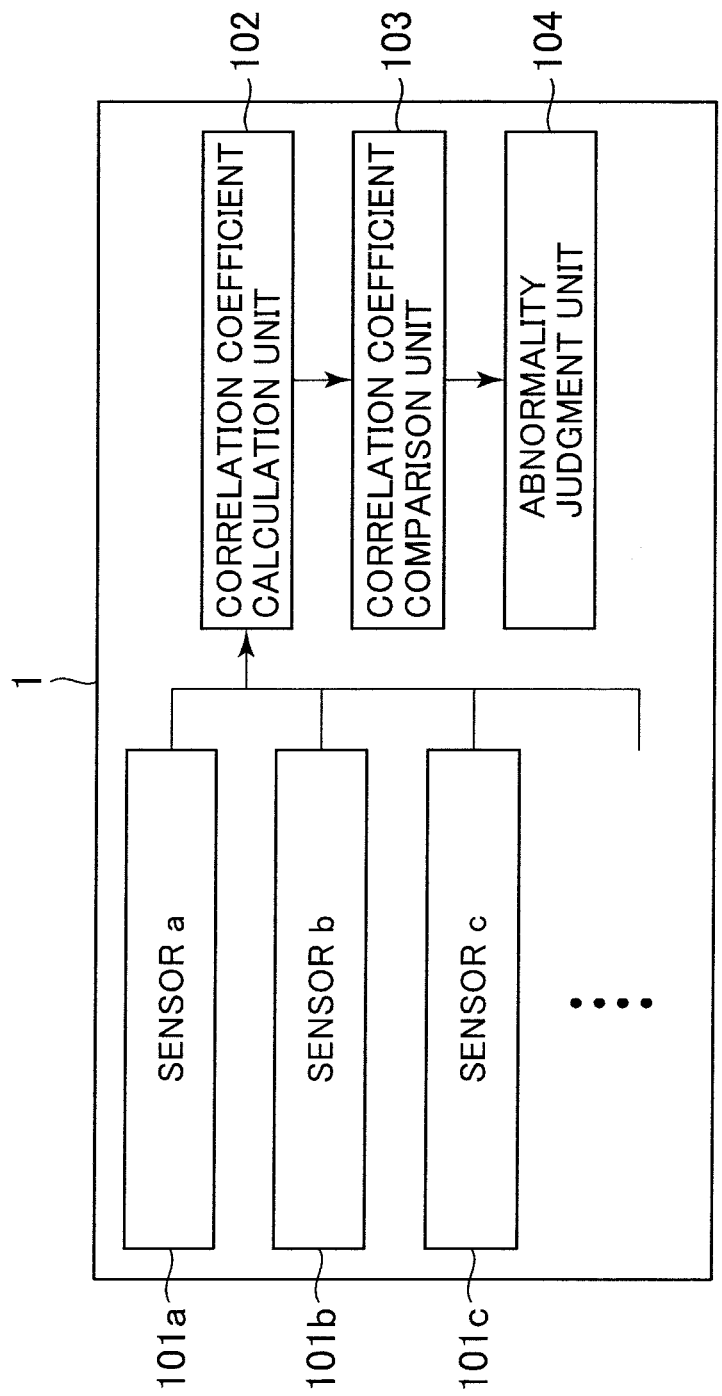
FIG. 1 is a block diagram showing the overall system configuration of an abnormality detecting device in accordance with the present invention.

Referring now to the drawings, a description will be given in detail of preferred embodiments in accordance with the present invention.

First Embodiment

Example 1 of Pumps

An embodiment of the present invention will be described below referring to FIGS. 1-12, by taking a hydraulic shovel (construction machine) as an example. This embodiment describes a case where three or more identical physical states are detected by a plurality of sensors as the plurality of related physical states. Incidentally, the present invention is applicable not only to hydraulic shovels but also to other construction machines such as crane trucks, wheel loaders and bulldozers.

FIG. 1 is a block diagram showing the overall system configuration of an abnormality detecting device in accordance with the present invention.

The abnormality detecting device 1 in accordance with the present invention is equipped with a plurality of sensors $101a$, $101b$, $101c$, . . . . A sensor signal (sensor information) from each of the sensors $101a$, $101b$, $101c$, . . . (hereinafter represented by "101" as needed) is inputted to a correlation coefficient calculation unit 102 via an unshown A/D converter. The correlation coefficient calculation unit 102 receives a plurality of (three or more) sensor signals in a predetermined same period, generates a plurality of pieces of (three or more pieces of) time-series physical state information in the same period by adding time information to the sensor signals, and calculates correlation coefficients between time-series values of the sensor signals, that is, between separated pieces of time-series physical state information. The correlation coefficients are inputted to a correlation coefficient comparison unit 103. The correlation coefficient comparison unit 103 calculates normalized deviations based on the correlation coefficients. While the procedure for calculating the normalized deviations using the correlation coefficients will be explained later, to put it simply, the normalized deviations are calculated by normalizing deviations of the calculated correlation coefficients by use of the average and the standard deviation of the correlation coefficients. Thereafter, the calculated normalized deviations are converted to correlation comparative values depending on their absolute values. The total sum of the correlation comparative values (correlation comparison total) is calculated in regard to each correlation coefficient. The correlation coefficient comparison unit 103 outputs the percentage of each correlation comparison total to an abnormality judgment unit 104.

The abnormality judgment unit 104 is configured to output a "warning judgment" when the percentage of the correlation comparison total is 50% or more, and to output an "abnormality judgment" when the percentage is 80% or more, for example.

Figure 2:
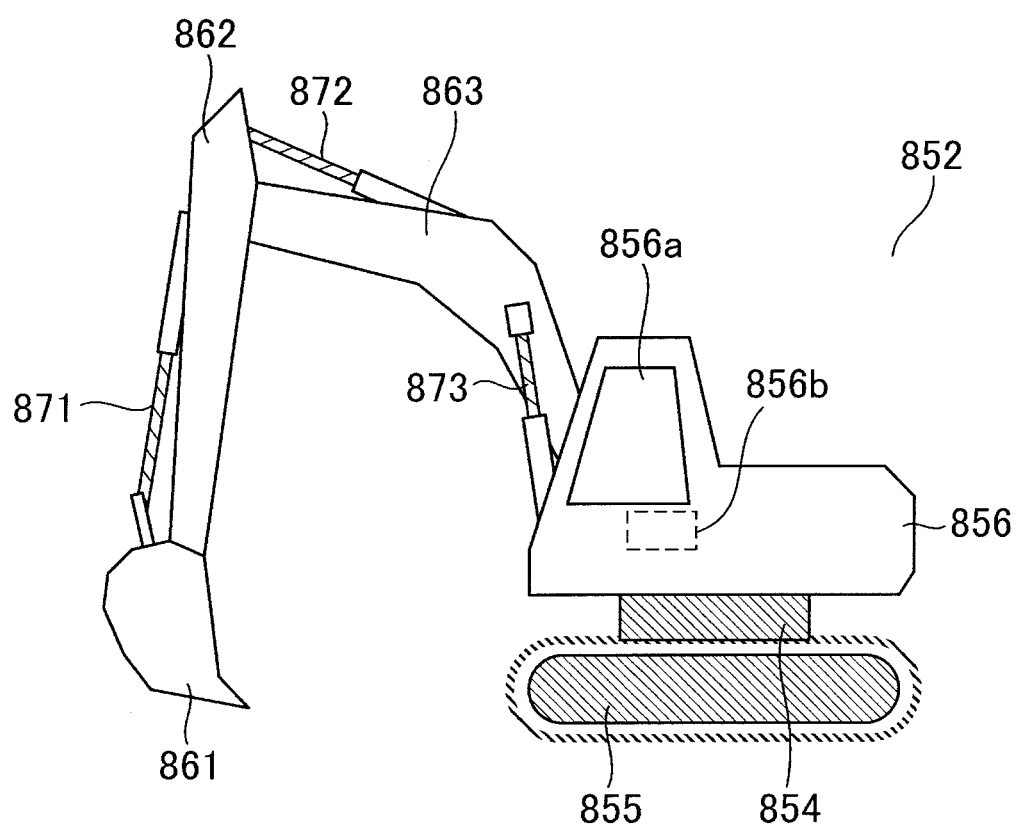
FIG. 2 is a schematic diagram showing the overall configuration of a hydraulic shovel as a construction machine to which the present invention is applied.

FIG. 2 is a schematic diagram showing the overall configuration of a construction machine which is equipped with the whole system of the abnormality detecting device in accordance with the present invention.

The operation of a hydraulic shovel 852 as an example of the construction machine will be explained here referring to FIG. 2. The hydraulic shovel 852 is equipped with various operating mechanisms and is thereby enabled to perform a variety of operations such as excavation. A bucket 861, an arm 862 and a boom 863 are driven by hydraulic cylinders 871, 872 and 873, respectively. These components relating to excavation are collectively called "front" in general. The bucket 861, the arm 862, the boom 863, etc. are moved by the expansion and contraction of the hydraulic cylinders 871, 872 and 873. The proximal end of the boom 863 is rotatably attached to the front of an upper swiveling structure 856. The upper swiveling structure 856 can be swiveled by a swiveling mechanism 854 on the top of a lower traveling structure 855.

Figure 3:
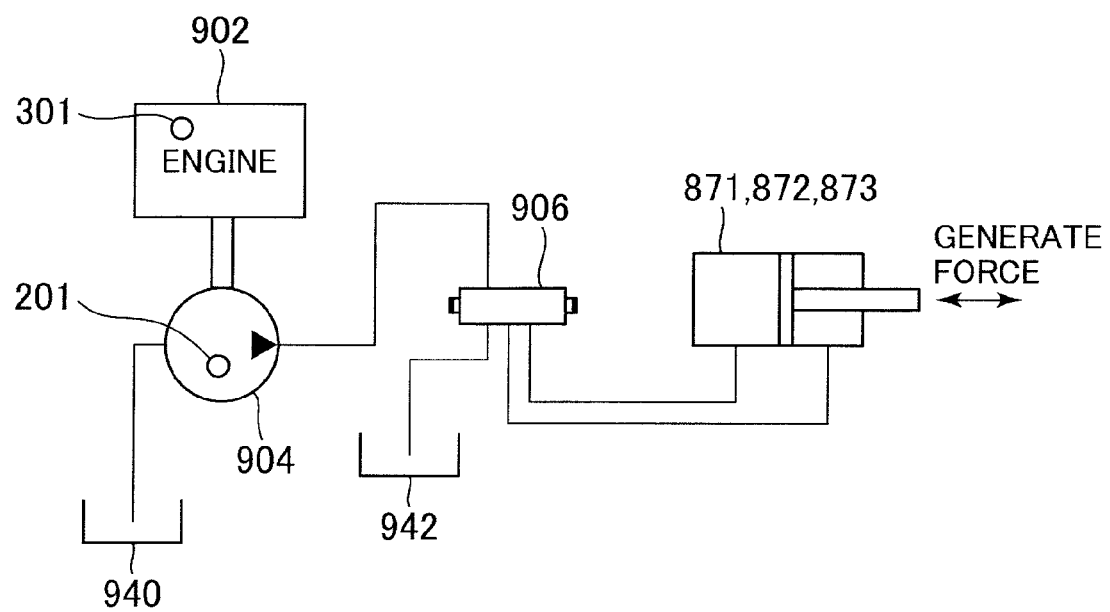
FIG. 3 is a schematic diagram showing a hydraulic system of the construction machine (hydraulic shovel) to which the present invention is applied.

FIG. 3 shows the configuration of a hydraulic system for generating the oil pressure of the hydraulic cylinders 871, 872 and 873.

Referring to FIG. 3, a hydraulic pump 904 is driven by torque from an engine 902. By the hydraulic pump 904, oil stored in a tank 940 is sent out to a control valve 906 which controls the oil pressure. The operation of the control valve 906, controlled from outside by the operating mechanism and a controller (unshown), drives the hydraulic cylinders 871, 872 and 873, etc., by which the oil pressure for moving the bucket 861, the arm 862, the boom 863, etc. is generated. Surplus oil unnecessary for the oil pressure control is discharged from the control valve 906 to a tank 942.

In this embodiment, the hydraulic pump 904 is equipped with a pump case drain pressure sensor 201 (explained later). The engine 902 is equipped with an engine cylinder temperature sensor 301.

The hydraulic shovel 852 has a plurality of (e.g., 5) hydraulic pumps 904 driven by the engine 902. Correspondingly, there are a plurality of (e.g., 5) pump case drain pressure sensors 201. In the following explanation, a reference character "904" or "201" will be used when the plurality of hydraulic pumps or pressure sensors are explained collectively by use of one representative reference character. When an individual hydraulic pump or pressure sensor has to be specified, a reference character with a subscript a, b, c, . . . (904a, 904b, 904c, . . . , 201a, 201b, 201c, . . . ) will be used.

The engine 902 of the hydraulic shovel 852 has a plurality of (e.g., 16) cylinders. Correspondingly, there are a plurality of (e.g., 16) engine cylinder temperature sensors 301. In the following explanation, a reference characters "301" will be used when the plurality of engine cylinder temperature sensors are explained collectively by use of one representative reference character. When an individual engine cylinder temperature sensor has to be specified, a reference character with a subscript a, b, c, (301a, 301b, 301c, ) will be used.

A controller 856b connected to a monitor is installed in a cab 856a of the upper swiveling structure 856 of the hydraulic shovel 852. The aforementioned A/D converter (unshown), the correlation coefficient calculation unit 102, the correlation coefficient comparison unit 103 and the abnormality judgment unit 104 are implemented by the controller 856b. The controller 856b may also be placed separately in a control room or the like. In such cases, data acquired by the detection by the sensors may be temporarily stored in a database of the hydraulic shovel 852, and the data stored in the database may be periodically extracted and transmitted to the controller or downloaded by the controller.

Figure 4:
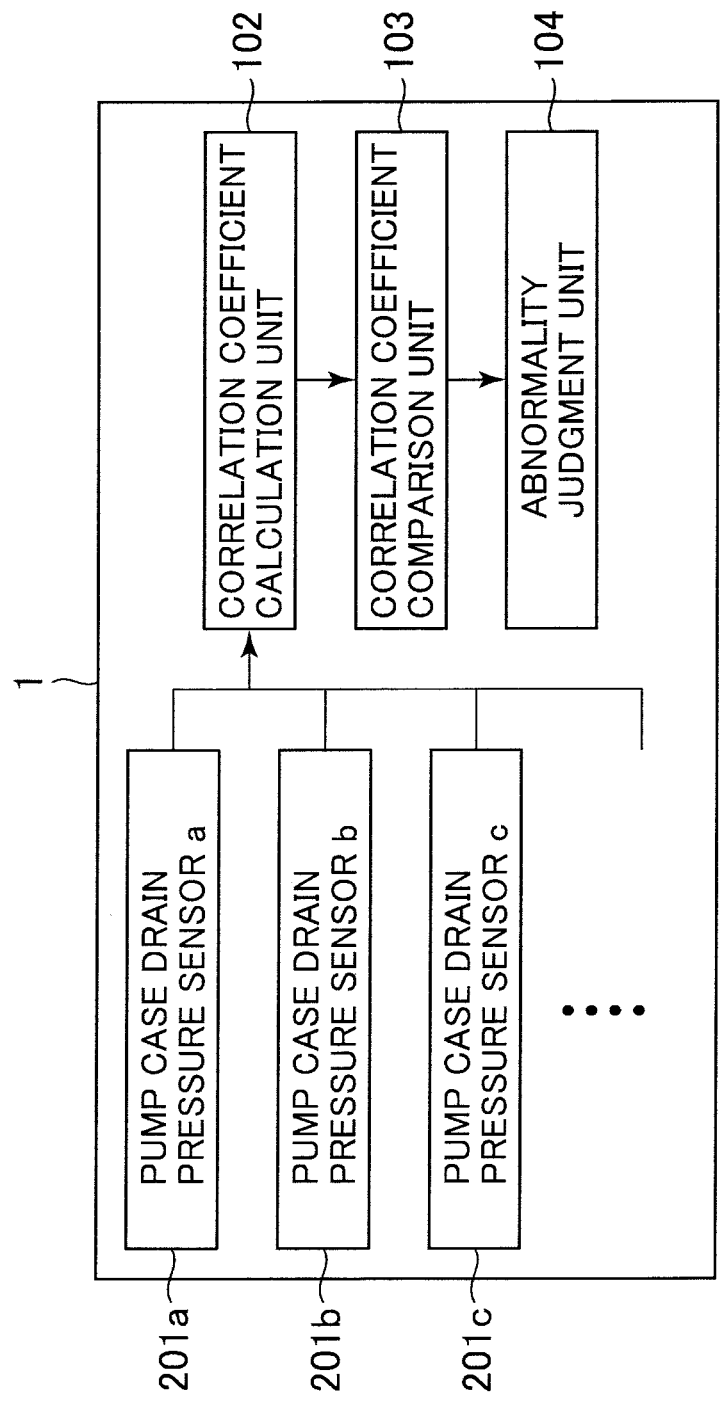
FIG. 4 is a block diagram showing the overall system configuration of an abnormality detecting device in accordance with a first embodiment of the present invention, wherein sensors in FIG. 1 are replaced with pump case drain pressure sensors.
Figure 5:
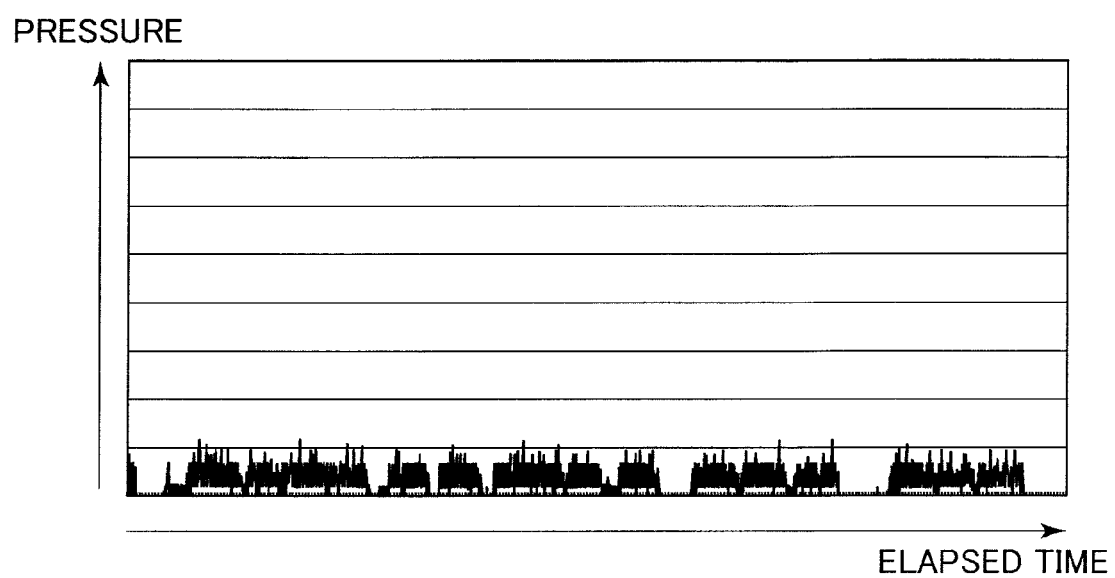
FIG. 5 is a graph showing the result of measurement of the pressure in a pump in a normal state in the first embodiment.

FIG. 4 shows the overall system configuration of an abnormality detecting device including pump case drain pressure sensors 201 in place of the sensors 101 shown in FIG. 1. This abnormality detecting device is used for the above-described construction machine 852. Each hydraulic pump 904 is an important component for adjusting the pressure to be transmitted. FIG. 5 shows the result of measurement of the pressure in a pump in the normal state (when the construction machine 852 is operating normally) using the pump case drain pressure sensor 201. FIG. 5 indicates that no extra high pressure occurred in the pump during the measurement period. It is assumed in this explanation that five pump case drain pressure sensors 201a-201e (unshown) measure the pressures in five pumps 904a-904e, respectively. The correlation coefficient calculation unit 102 receives a plurality of sensor signals in the same period in a time-series manner, generates five pieces of time-series pressure information in the same period, and calculates correlation coefficients between the time-series values of separated pieces of pressure information. FIG. 6 shows a table 601 indicating the result of the correlation coefficient calculation. The correlation coefficient is calculated according to the equation (1) described below.

Let Xi and Xj (i, j=1, . . . , n) (n: the number of sensors supplying the input values (5 in this example)) represent two input values arbitrarily selected from the input values (drain pressure values measured by the pump case drain pressure sensors 201 in this example) and Xi(t) and Xj(t) represent the measurement values of Xi and Xj at time t, the correlation coefficient $\rho(i, j)$ between the input values Xi and Xj between time t=0 and time t=T−1 is calculated using averages $\mu i$ and $\mu j$ and standard deviations $\sigma i$ and $\sigma j$ according to the following equation:

$$\rho(i,j) = \Sigma(Xi(t)-\mu i)(Xj(t)-\mu j)/(T \cdot \sigma i \cdot \sigma j) \quad (1)$$

where $$\mu i = \Sigma Xi(t)/T, \mu j = \Sigma Xj(t)/T$$

$$\sigma i = (n\Sigma Xi(t)^2 - (\Sigma Xi(t))^2)/(T \cdot (T-1))$$

$$\sigma j = (n\Sigma Xj(t)^2 - (\Sigma Xj(t))^2)/(T \cdot (T-1))$$

The correlation coefficient can take on values from −1 to 1. Every value shown in FIG. 6 is close to 1 (correlation between identical values is of course 1), indicating that there is a strong correlation among the input values.

The correlation coefficient comparison unit 103 calculates normalized deviations based on the correlation coefficients shown in the table 601. The procedure for calculating the normalized deviations using the correlation coefficients will be explained later. FIG. 7 shows a table 701 indicating the normalized deviations calculated based on the correlation coefficients. Further, the correlation coefficient comparison unit 103 converts the normalized deviations to correlation comparative values. For example, the correlation coefficient comparison unit 103 converts the normalized deviation to a correlation comparative value "1" if the absolute value of the normalized deviation is 3.0 or more, to a correlation comparative value "0.5" if the absolute value is 1.5 or more and less than 3.0, and to a correlation comparative value "0" if the absolute value is less than 1.5. The result of the conversion is shown in a table 801 in FIG. 8. The correlation comparative values 1, 0.5 and 0 are values previously determined as abnormality flag information. Finally, the correlation coefficient comparison unit 103 calculates the total sum of the correlation comparative values in regard to each correlation coefficient (correlation comparison total and percentage shown in a table 802 in FIG. 8). The correlation comparison total and its percentage are values indicating the degree of difference between each correlation coefficient and other correlation coefficients acquired by totalizing the correlation comparative values. When the correlation comparison total is less than 50%, the component corresponding to the correlation comparison total is judged to be operating normally. The judgment on the occurrence of an abnormality may also be made directly from the correlation comparison total.

Figure 9:
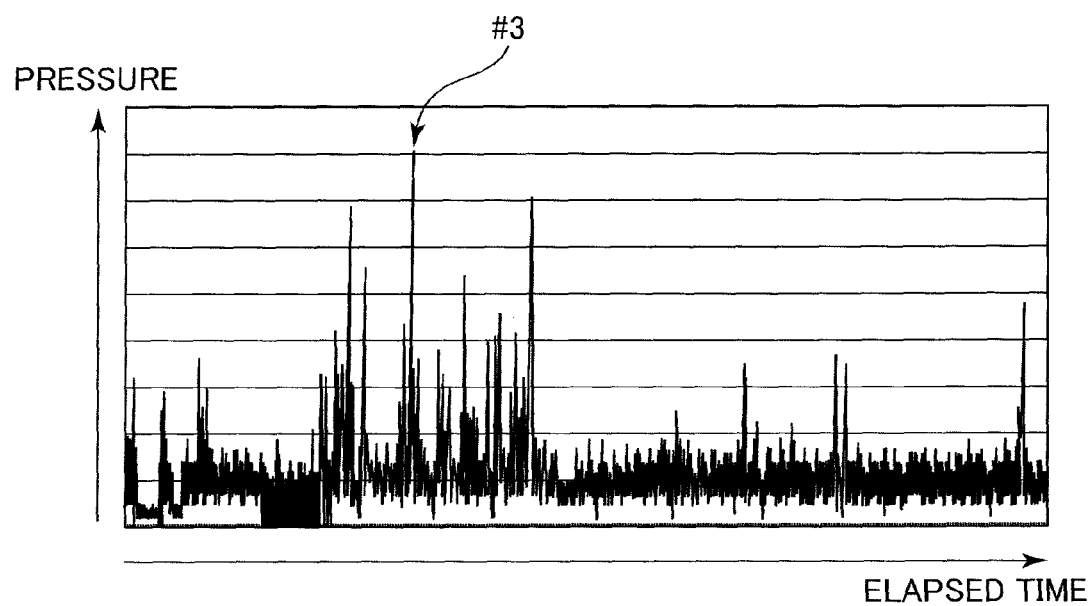
FIG. 9 is a graph showing the result of the pump pressure measurement when an abnormality has occurred in the first embodiment.

FIG. 9 shows the result of the pump pressure measurement in a case where an abnormality has occurred. As is clear from FIG. 9, the pressure of the pump #3 has increased. Correlation coefficients calculated by the correlation coefficient calculation unit 102 in this case are shown in a table 1001 in FIG. 10. The table 1001 indicates that correlation coefficients regarding the pump #3 have decreased while those regarding the other pumps have not changed considerably. This means that the pump #3 is showing an operational tendency different from those of the other pumps. For the correlation coefficients, variations in the correlation coefficients, that is, the normalized deviations are detected by use of the correlation coefficient comparison unit 103. In the table 1001 in FIG. 10, for example, the correlation coefficients of the pumps #1-#5 with respect to the pump #1 are 1.00, 0.88, 0.15, 0.89 and 0.88. By use of the average $\mu(\rho 1)$ and the standard deviation $\sigma(\rho 1)$ of these correlation coefficients $\rho(1, j)$ ($j=1, \ldots, 5$), the correlation coefficient comparison unit 103 normalizes deviations of the correlation coefficients $\rho(1, j)$ from the average $\mu(\rho 1)$. The normalized values (normalized deviations) $\rho s(1, j)$ ($j=1, \ldots, 5$) are expressed by the following equation (2):

$$\rho s(1,j)=(\rho(1,j)-\mu(\rho 1))/\sigma(\rho 1) \quad (2)$$

The normalized deviations corresponding to the correlation coefficients 1.00, 0.88, 0.15, 0.89 and 0.88 of the pump #1 are 0.70, 0.35, −1.77, 0.38 and 0.35 as shown in a table 1101 in FIG. 11. By generalizing the equation (2) for all the pumps #1-#5, the following equation (2') is acquired:

$$\rho s(i,j)=(\rho(i,j)-\mu(\rho i)/\sigma(\rho i)(i=1,\ldots,5, j=1,\ldots,5) \quad (2')$$

The correlation coefficient comparison unit 103 converts the normalized deviation to the correlation comparative value 1.0 if the absolute value of the normalized deviation is 3 or more, to the correlation comparative value 0.5 if the absolute value is 1.5 or more and less than 3, and to the correlation comparative value 0 if the absolute value is less than 1.5. The result of the conversion is shown in a table 1201 in FIG. 12. The correlation coefficient comparison unit 103 finally calculates the total sum of the correlation comparative values in regard to each correlation coefficient. As shown in a table 1202 in FIG. 12, the correlation comparison totals for the pump pressures #1-#5 are 0, 0, 2.5, 0 and 0, respectively. In terms of percentage, the correlation comparison totals are expressed as 0%, 0%, 50%, 0% and 0%. The correlation coefficient comparison unit 103 outputs the percentages of the correlation comparison totals to the abnormality judgment unit 104.

The abnormality judgment unit 104 outputs a "warning judgment" when the percentage of the correlation comparison total is 50% or more. When the percentage is 80% or more, the abnormality judgment unit 104 outputs an "abnormality judgment". In the example of FIG. 12, the abnormality judgment unit 104 outputs the "warning judgment" for the pump #3 as the judgment result. The output of the judgment result can be made by displaying character strings "warning judgment" or "abnormality judgment" on the monitor, for example.

According to this embodiment, the detection of abnormality is conducted using comparative information on the correlation coefficients of the plurality of pieces of sensor information acquired from a plurality of pressure sensors depending on the control status of each hydraulic pump. This eliminates the need of previously calculating the learning values or judgment threshold values corresponding to multiple states of the hydraulic shovel from measurement data. Therefore, appropriate judgments can be made on the machine by the same judgment method and failures of the machine can be prevented consistently in a variety of operating environments and operational configurations of the hydraulic shovel.

Second Embodiment

Example 2 of Pumps

Another embodiment of the present invention will be described below referring to FIG. 13 and the above-described embodiment. This embodiment is a modification of the first embodiment.

Figure 13:
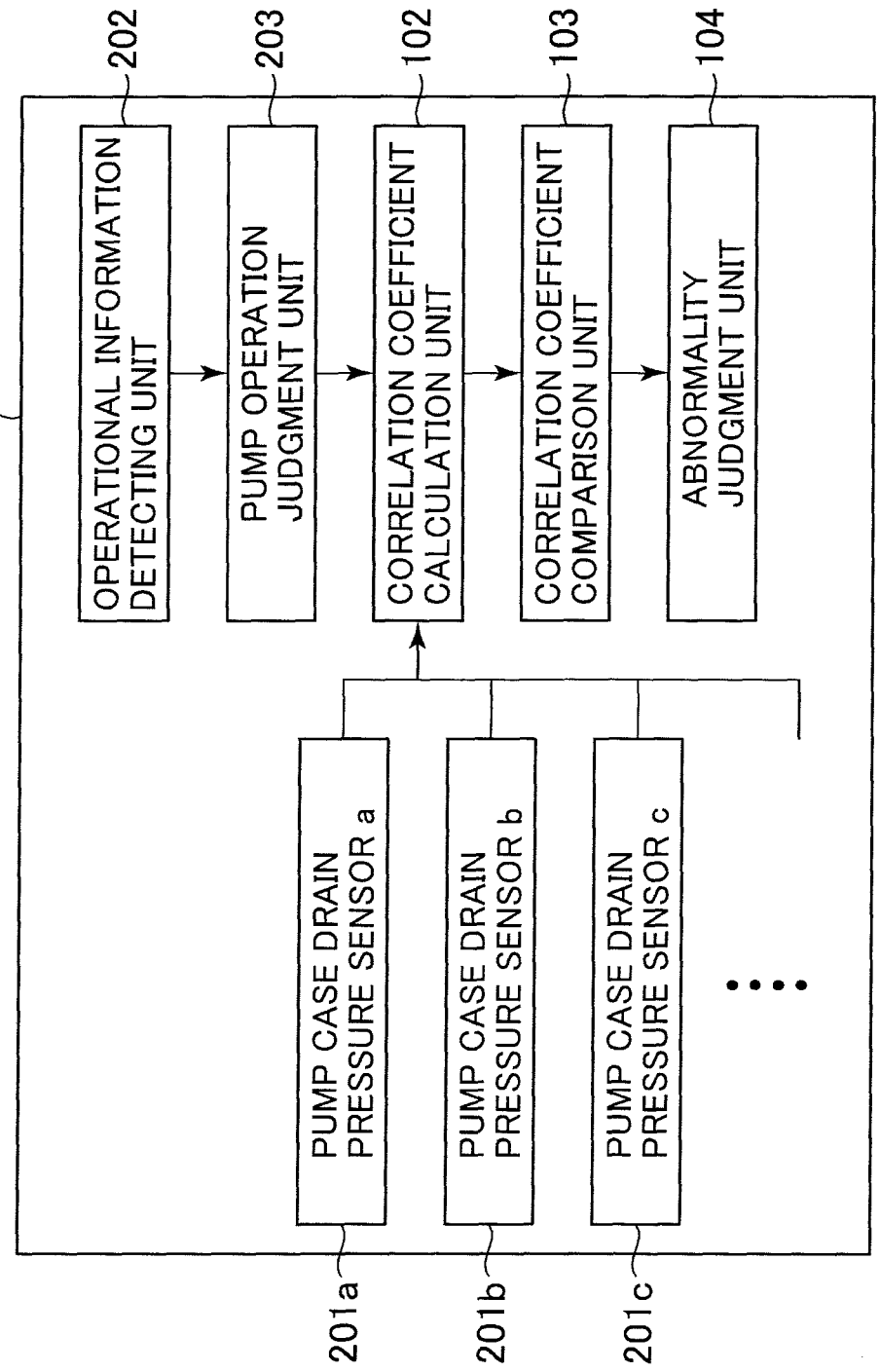
FIG. 13 is a block diagram showing the overall system configuration of an abnormality detecting device in accordance with a second embodiment of the present invention.

Referring to FIG. 13, the abnormality detecting device 1 in this embodiment further comprises an operational information detecting unit 202 for detecting operational information on the hydraulic shovel 852 (see FIG. 2) and a pump operation judgment unit 203 for judging the operating status of each hydraulic pump 904 based on the operational information, in addition to the configuration shown in FIG. 2. The hydraulic shovel 852 is equipped with a control lever device (as one of the operating mechanisms) which generates operating pilot pressure corresponding to the operator's input to a lever and drives the control valve 906 by the operating pilot pressure. The operational information detecting unit 202 is a pressure sensor for detecting the operating pilot pressure, for example. In this case, when the operating pilot pressure exceeds a predetermined value, the pump operation judgment unit 203 judges that the hydraulic pump 904 corresponding to the control valve 906 driven by the operating pilot pressure is in the operating state.

Based on the judgment result by the pump operation judgment unit 203, the correlation coefficient calculation unit 102 calculates the correlation coefficients using only the pressure information on hydraulic pumps 904 that are in the operating state.

According to this embodiment, hydraulic pumps not in operation are excluded from the diagnosis, by which more precise abnormality detection can be conducted.

Third Embodiment

Example 1 of Engine

Still another embodiment of the present invention will be described below referring to FIGS. 14-17 and the above-described embodiments, by taking a hydraulic shovel (construction machine) as an example. This embodiment also describes a case where three or more identical physical states are detected by a plurality of sensors as the plurality of related physical states.

Figure 14:
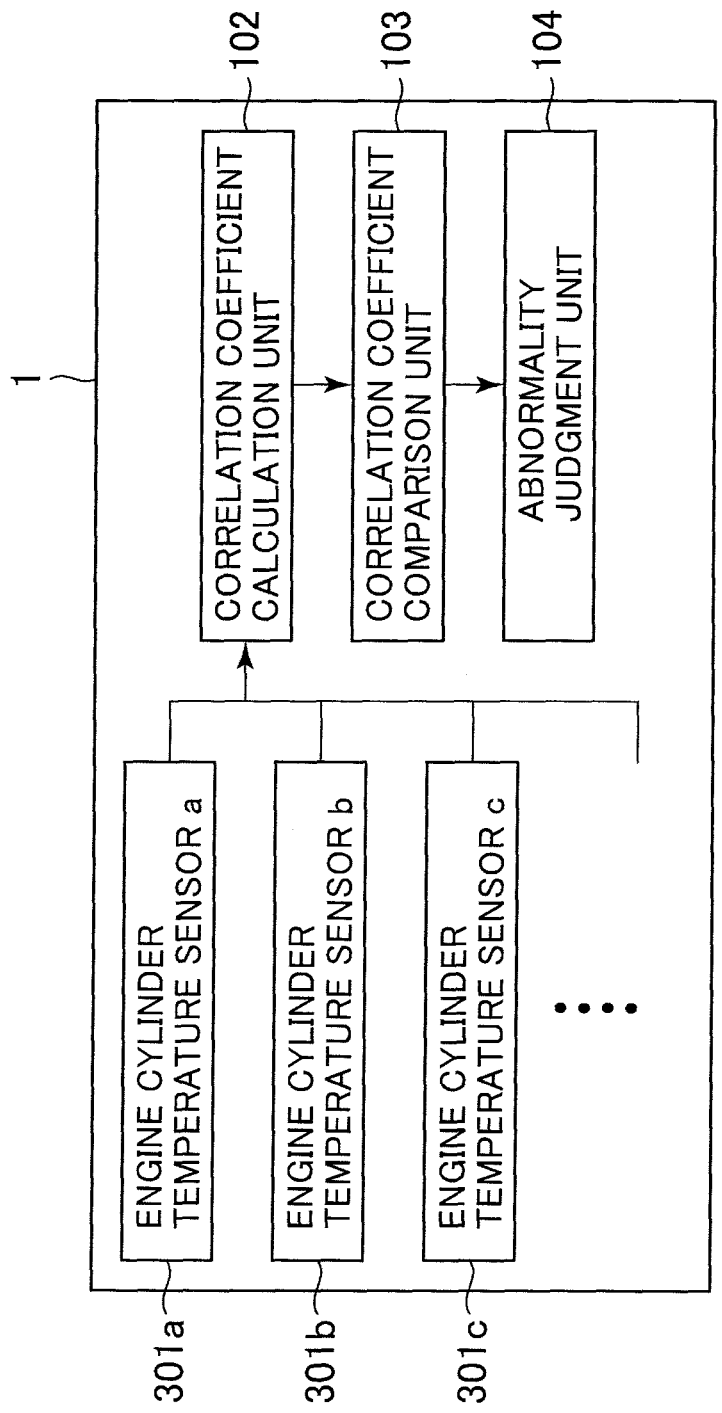
FIG. 14 is a block diagram showing the overall system configuration of an abnormality detecting device in accordance with a third embodiment of the present invention.

FIG. 14 shows an abnormality detecting device obtained by replacing the sensors 101 shown in FIG. 1 with engine cylinder temperature sensors 301. As mentioned above, the engine 902 of the hydraulic shovel 852 has 16 cylinders. The temperatures of the cylinders are measured by 16 engine cylinder temperature sensors 301*a*-301*p* (unshown), with which the operating status of the engine can be detected.

Figure 15:
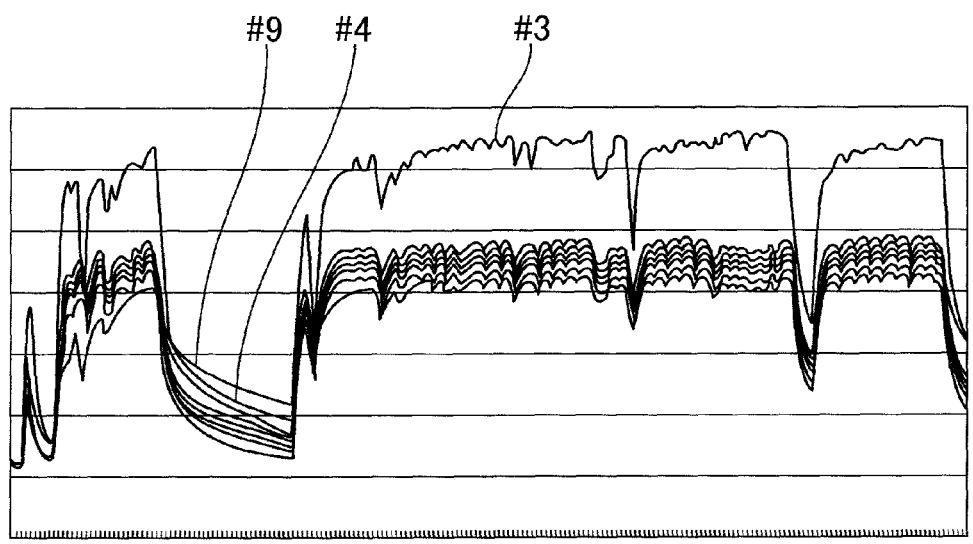
FIG. 15 is a graph showing engine cylinder temperatures measured in the third embodiment.

FIG. 15 shows the engine cylinder temperatures measured by the engine cylinder temperature sensors 301*a* - 301*p* in an abnormal state (e.g., when an abnormality has occurred in an injection mechanism for supplying fuel to an engine cylinder and the fuel is supplied excessively to the cylinder). FIG. 15 indicates that the temperature of the cylinder #3 is higher than those of the other cylinders and the temperatures of the cylinders #4 and #9 are showing variations different from those of the other cylinders. For these cylinder temperatures, the correlation coefficients are calculated by the correlation coefficient calculation unit 102 similarly to the first embodiment. FIG. 16 shows the result of the correlation coefficient calculation. FIG. 17 shows the result of the comparison of the correlation coefficients by the correlation coefficient comparison unit 103. The percentage of the correlation comparison total of the cylinder #4 is 41% and that of the cylinder #9 is 94%. As the result of the judgment by the abnormality judgment unit 104, the "abnormality judgment" is outputted for the cylinder #9 only (the percentage 41% of the cylinder #4 is less than 50% for the "warning judgment").

Fourth Embodiment

Example 2 of Engine

Still another embodiment of the present invention will be described below referring to FIG. 18 and the above-described embodiments. This embodiment is a modification of the third embodiment.

Figure 18:
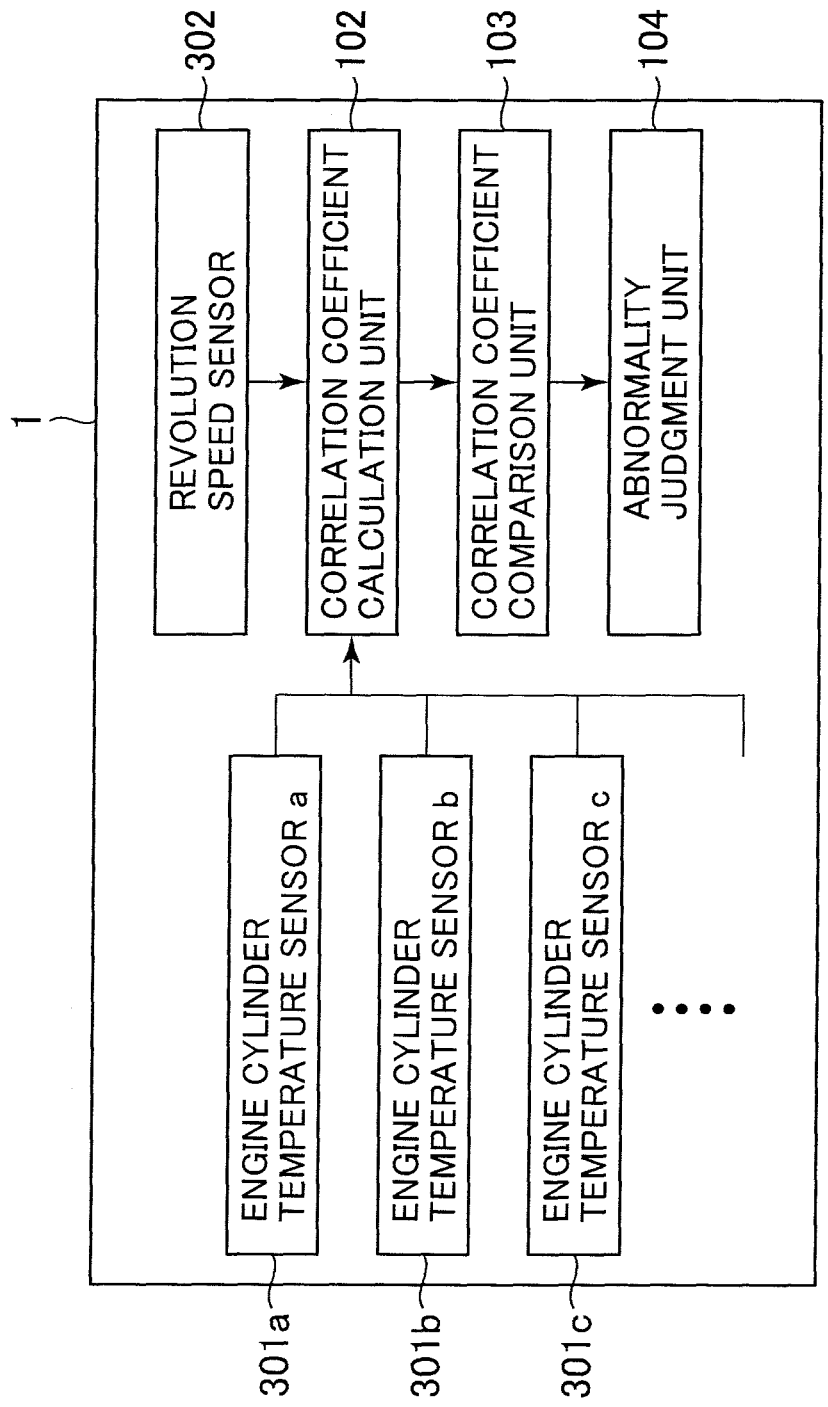
FIG. 18 is a block diagram showing the overall system configuration of an abnormality detecting device in accordance with a fourth embodiment of the present invention.

Referring to FIG. 18, the abnormality detecting device 1 in this embodiment further comprises a revolution speed sensor 302 for detecting the revolution speed of the engine 902 (see FIG. 3) in addition to the configuration shown in FIG. 14.

The correlation coefficient calculation unit 102 calculates the correlation coefficients using the temperature information acquired only when the engine revolution speed detected by the revolution speed sensor 302 is a predetermined value or more.

According to this embodiment, temperature information acquired when the engine 902 is operating at a revolution speed less than the predetermined value is excluded from the diagnosis, by which more precise abnormality detection can be conducted.

Fifth Embodiment

Example 3 of Engine

Still another embodiment of the present invention will be described below referring to FIGS. 19-21 and the above-described embodiments, by taking a hydraulic shovel (construction machine) as an example. This embodiment also describes a case where three or more identical physical states are detected by a plurality of sensors as the plurality of related physical states.

While the cylinder #9 was judged to have an abnormality and there was a sign of an abnormality in the cylinder #4 in the above third embodiment, it was impossible to judge the abnormality in the cylinder #3. This was because the variations in the temperature of the cylinder #3 were similar to those of the other cylinders (even though the temperature range was different from those of the other cylinders). M Therefore, this embodiment describes the detection of an abnormality like that of the cylinder #3.

Figure 19:
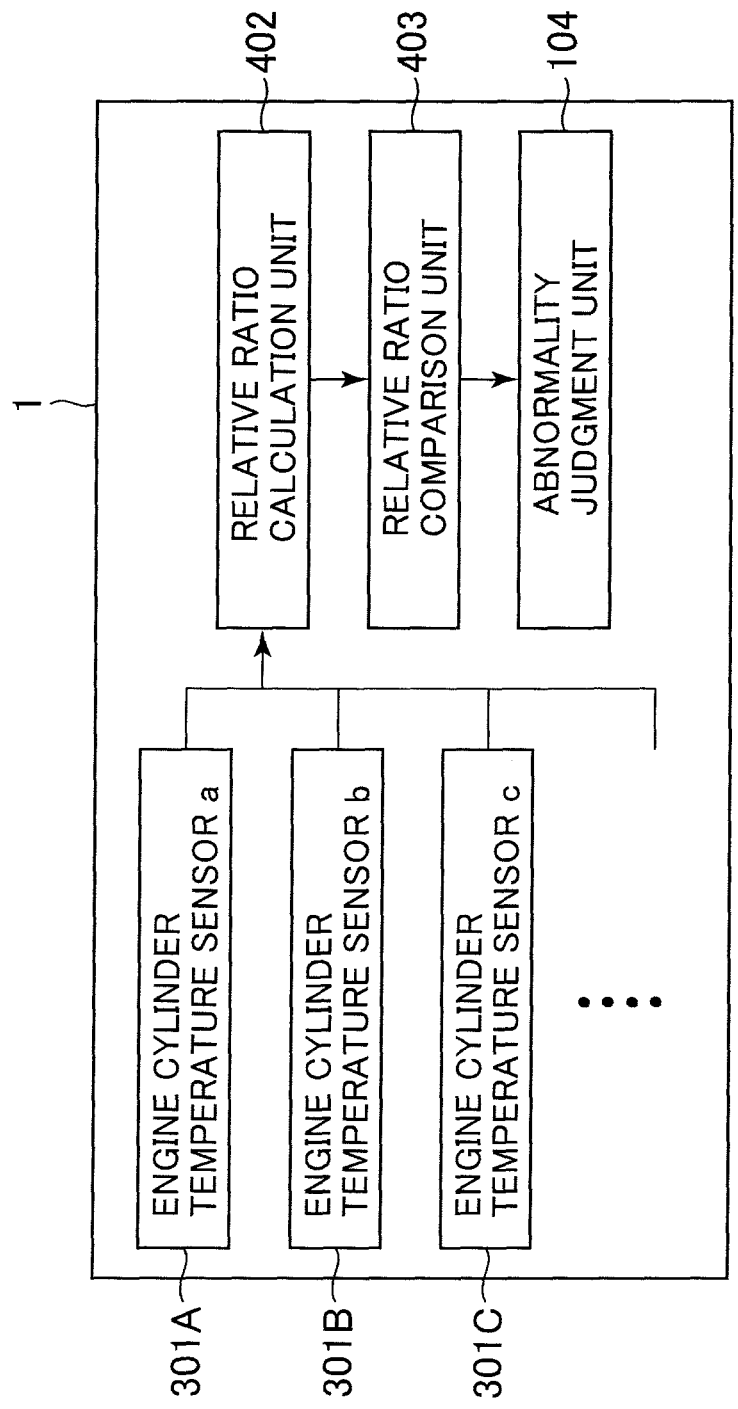
FIG. 19 is a block diagram showing the overall system configuration of an abnormality detecting device in accordance with a fifth embodiment of the present invention.

FIG. 19 shows the configuration of an abnormality detecting device 1 in accordance with this embodiment. The abnormality detecting device 1 of this embodiment comprises a relative ratio calculation unit 402 and a relative ratio comparison unit 403 in place of the correlation coefficient calculation unit 102 and the correlation coefficient comparison unit 103 in the configuration of the third embodiment shown in FIG. 14.

Let Xi and Xj (i, j=1, . . . , n) (n: the number of sensors supplying the input values (16 in this example)) represent two input values arbitrarily selected from the input values (cylinder temperatures measured by the engine cylinder temperature sensors 301 in this example) and Xi(t) and Xj(t) represent the measurement values of Xi and Xj at time t, the relative ratio v(i, j) of the input value Xj with respect to the input value Xi between time t=0 and time t=T−1 is calculated according to the following equation:

$$v(i,j)=(\Sigma Xj(t)/Xi(t))/T \qquad (3)$$

FIG. 20 shows the result of the calculation of the relative ratios between engine cylinder temperatures by the relative ratio calculation unit 402. FIG. 21 shows the result of calculation of relative ratio comparison totals and their percentages by the relative ratio comparison unit 403. The relative ratio comparison total is calculated by replacing the correlation coefficients used in the above third embodiment with the relative ratios. The percentages of the relative ratio comparison totals are outputted from the relative ratio calculation unit 402 to the abnormality judgment unit 104 and an "abnormality judgment" is outputted by the abnormality judgment unit 104 as shown in FIG. 21.

Incidentally, while this embodiment has been described as a modification of the third embodiment, the idea of this embodiment is applicable also to other embodiments in similar ways.

Sixth Embodiment

Example of Hydraulic Oil Cooling Device

Still another embodiment of the present invention will be described below referring to FIGS. 22-24 and the above-described embodiments, by taking a hydraulic shovel (construction machine) as an example. This embodiment describes a case where correlatively changing two or more physical states are detected by a plurality of sensors as the plurality of related physical states.

Figure 22:
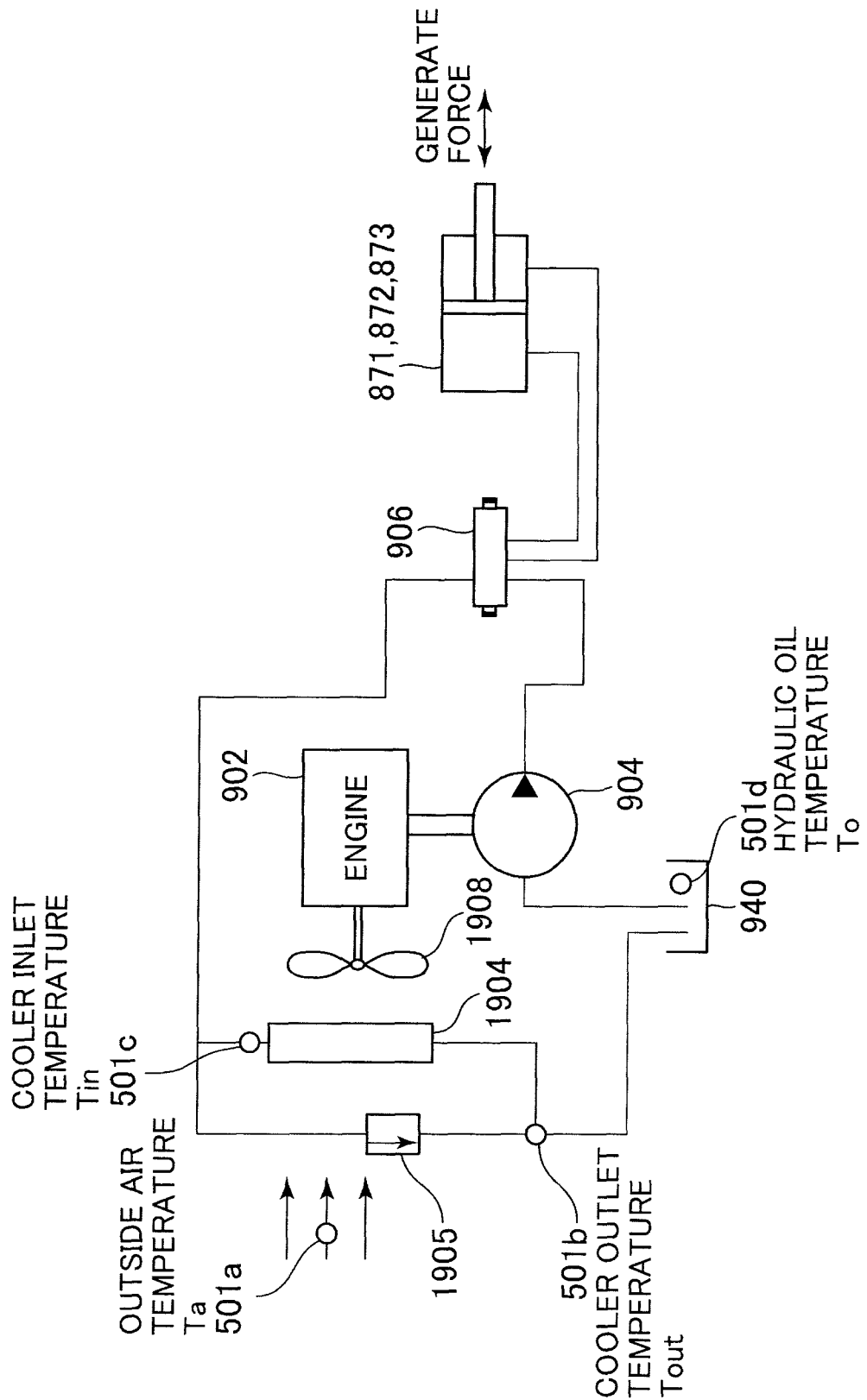
FIG. 22 is a schematic diagram showing the configuration of a hydraulic system obtained by adding a hydraulic oil cooling device to the hydraulic system shown in FIG. 3.

FIG. 22 shows the configuration of a hydraulic system obtained by adding a hydraulic oil cooling device to the hydraulic system shown in FIG. 3.

Referring to FIG. 22, kinetic energy generated by the engine 902 drives the hydraulic pump 904 as mentioned above. The hydraulic pump 904 pumps the hydraulic oil up from the hydraulic oil tank 940 and sends the hydraulic oil to the hydraulic cylinders 871, 872, 873, etc. via the control valve 906. The hydraulic cylinders 871, 872, 873, etc. driven by the hydraulic oil from the hydraulic pump 904 generate the oil pressure for moving the bucket 861, the arm 862, the boom 863, etc.

With the repeated expansion and contraction of the hydraulic cylinders 871, 872, 873, etc., the hydraulic oil is returned to the hydraulic oil tank 940. The hydraulic oil driving the hydraulic cylinders 871, 872, 873, etc. heats up due to the high pressure, and thus the hydraulic oil before returning to the hydraulic oil tank 940 is cooled down by a hydraulic oil cooler 1904. In the hydraulic oil cooler 1904, a cooling fan 1908 connected to the engine 902 is driven and rotated by the engine torque, draws in the outside air and thereby cools down the hydraulic oil. The cooled hydraulic oil is returned to the hydraulic oil tank 940. A relief valve 1905 is a safety valve for preventing the hydraulic oil cooler 1904 from being broken by excessively high pressure of the hydraulic oil returning from the control valve 906. When a failure occurs to the relief valve 1905 designed to open as needed, abnormalities occur to the pressure and temperature of related components.

Since the hydraulic oil cooler 1904 is cooled by the outside air, increase in outside air temperature Ta leads to increase in hydraulic oil temperature To, cooler inlet temperature Tin and cooler outlet temperature Tout.

Figure 23:
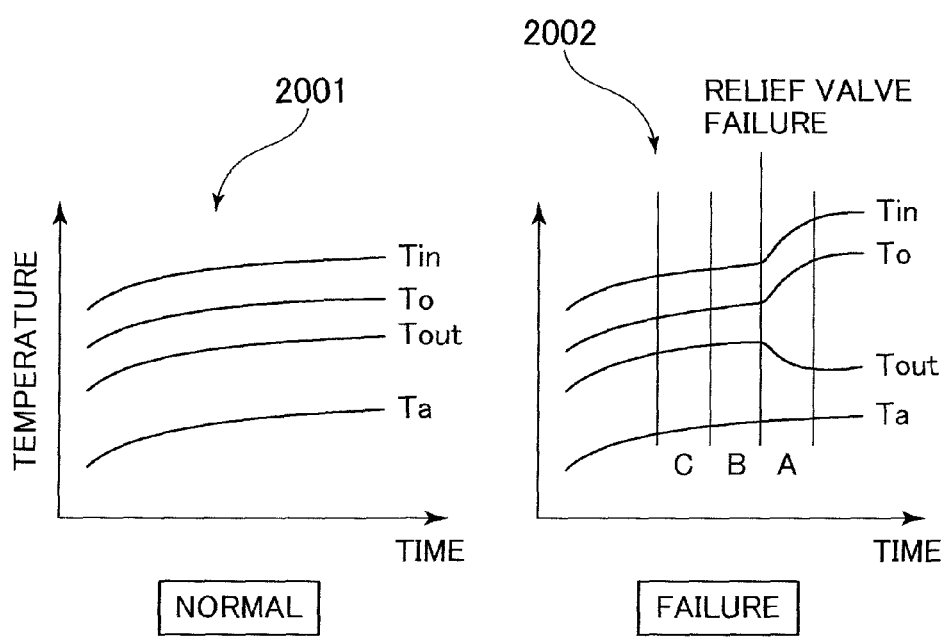
FIG. 23 is a graph showing temperature variations when a relief valve of the hydraulic oil cooling device is operating normally and temperature variations when the relief valve has failed.

FIG. 23 shows temperature variations 2001 when the relief valve 1905 is operating normally and temperature variations 2002 when the relief valve 1905 has failed.

Let us consider a case where the relief valve 1905 can not close due to a failure. Since the relief valve 1905 remains open, the amount of the hydraulic oil flowing into the hydraulic oil cooler 1904 decreases and the cooling of the hydraulic oil becomes insufficient. As indicated by the temperature variations 2002, the cooler outlet temperature Tout drops due to the decrease in the amount of the hydraulic oil flowing into the hydraulic oil cooler 1904, whereas the hydraulic oil temperature To rises due to increase in the amount of the hydraulic oil not flowing into the hydraulic oil cooler 1904. As a result, the cooler inlet temperature Tin of the hydraulic oil also rises.

The abnormality detecting device in this embodiment detects the outside air temperature Ta, the hydraulic oil temperature To, the cooler inlet temperature Tin and the cooler outlet temperature Tout with temperature sensors 501a, 501b, 501c and 501d, respectively. Based on the sensor values as inputs, the abnormality detecting device detects changes in the correlation coefficients in the abnormal operation with respect to the correlation coefficients in the normal operation, by which an abnormality in the hydraulic oil cooling device (failure of the relief valve 1905 in the above example) can be detected.

In this embodiment, correlation coefficients in different periods are used in order to acquire correlation coefficients in the normal operation.

Specifically, different periods A, B and C shown in FIG. 23 are considered. The period A is a period just after the occurrence of the failure of the relief valve 1905. The period B is a period just before the occurrence of the failure of the relief valve 1905. The period C is a period before the period B. In the periods B and C, the hydraulic oil temperature To, the cooler inlet temperature Tin and the cooler outlet temperature Tout increase along with the increase in the outside air temperature Ta. Therefore, occurrence of some kind of abnormality in the period A can be detected by calculating the correlation coefficients in the period B and in the period C using the sensor values in the periods B and C and comparing the correlation coefficients with correlation coefficients calculated using the sensor values in the period A.

Further, from the correlation coefficients in the period A, it is possible to detect that the cooler outlet temperature Tout is behaving differently from the cooler inlet temperature Tin and the hydraulic oil temperature To, judge that an abnormality has occurred to a part related to the temperature sensor 501d, and presume that a failure has occurred to the relief valve 1905.

Figure 24:
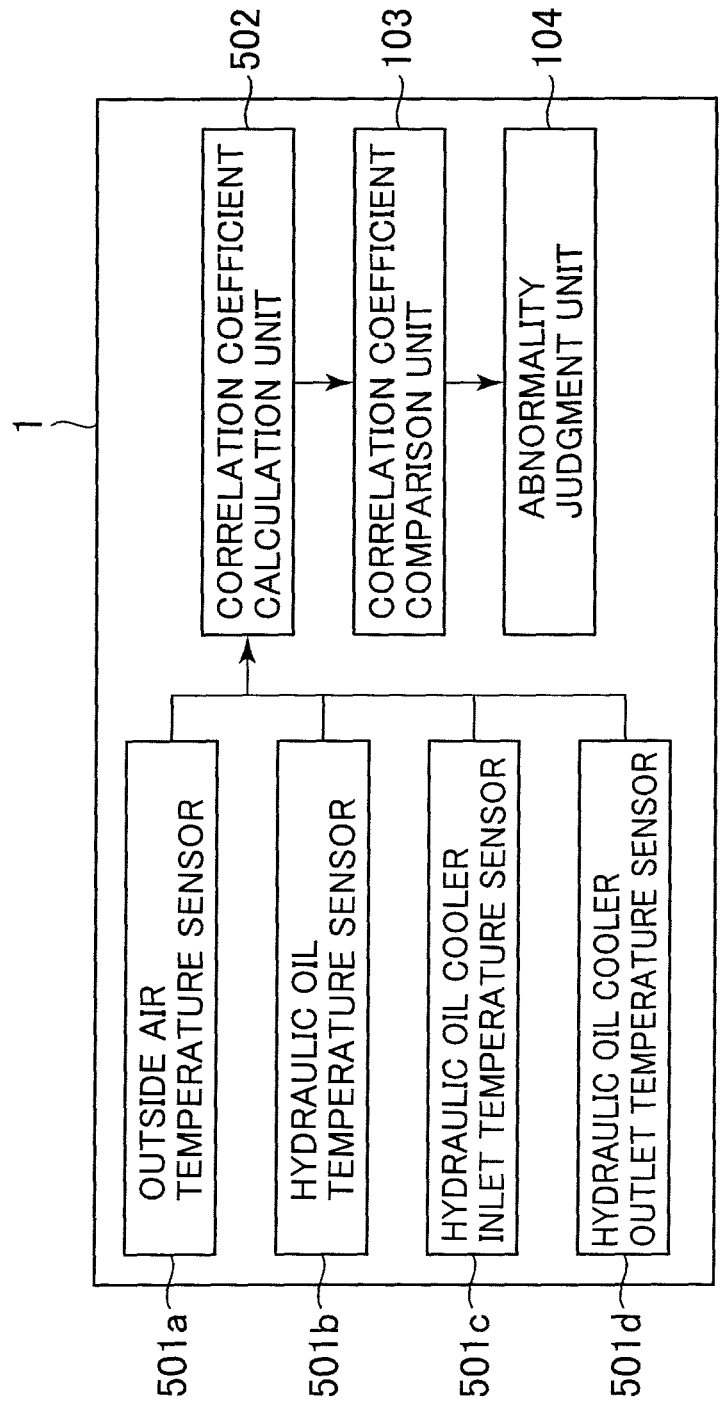
FIG. 24 is a block diagram showing the overall system configuration of an abnormality detecting device in accordance with a sixth embodiment of the present invention.

FIG. 24 is a block diagram showing the configuration of the abnormality detecting device 1 in accordance with this embodiment. The abnormality detecting device 1 of this embodiment is obtained by replacing the sensors 101 in FIG. 1 with the temperature sensors 501a, 501b, 501c and 501d and replacing the correlation coefficient calculation unit 102 in FIG. 1 with a correlation coefficient calculation unit 502.

The temperature sensors 501a, 501b, 501c and 501d detect the outside air temperature Ta, the hydraulic oil temperature To, the cooler inlet temperature Tin and the cooler outlet temperature Tout, respectively.

The correlation coefficient calculation unit 502 receives the sensor signals outputted from the temperature sensors 501a, 501b, 501c and 501d in three or more different predetermined periods (periods A, B and C in the above example) and generates three or more pieces of time-series physical state information in the same periods for each sensor (three or more time-series sensor values for each of the outside air temperature Ta, the hydraulic oil temperature To, the cooler inlet temperature Tin and the cooler outlet temperature Tout in the above example). Then, the correlation coefficient calculation unit 502 calculates six or more correlation coefficients from the three or more pieces of time-series physical state information regarding each temperature sensor.

The correlation coefficient comparison unit 103 and the abnormality judgment unit 104 execute processes equivalent to those in the first embodiment, etc., by which the "warning judgment" is outputted when the percentage of the correlation comparison total is 50% or more and the "abnormality judgment" is outputted when the percentage is 80% or more.

Incidentally, while the number of periods for inputting the sensor signals is three in the above embodiment, the number of periods can also be greater than three. With the increase in the number of periods for inputting the sensor signals, the probability of incorporation of sensor signals in the normal operation into the abnormality judgment increases, by which more precise abnormality detection can be conducted.

While the three periods for inputting the sensor signals are three consecutive periods in the above embodiment, these periods may also be nonconsecutive.

Seventh Embodiment

Example 1 of Engine Oil Cooling System and Coolant Cooling System

Still another embodiment of the present invention will be described below referring to FIGS. 25-27 and the above-described embodiments, by taking a hydraulic shovel (construction machine) as an example. This embodiment also describes a case where correlatively changing two or more physical states are detected by a plurality of sensors as the plurality of related physical states.

Figure 25:
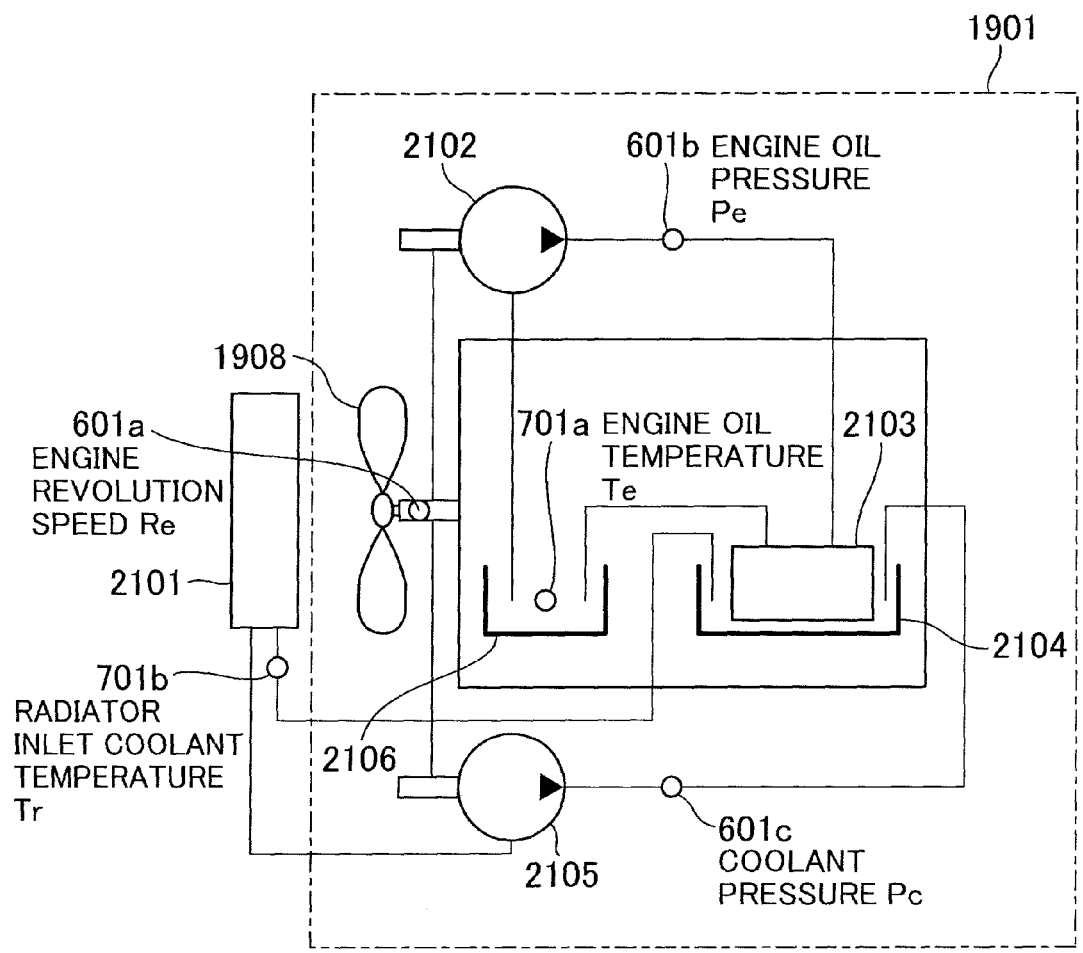
FIG. 25 is a schematic diagram showing the configuration of an engine oil cooling system and a coolant cooling system of the hydraulic shovel.

FIG. 25 is a schematic diagram showing the configuration of an engine oil cooling system and a coolant cooling system of the hydraulic shovel.

Referring to FIG. 25, the engine 1901 uses engine oil for reducing its temperature. An oil pump 2102, connected with a rotating part of the engine 1901, is driven by the rotation of the engine 1901. The oil pump 2102 pumps the engine oil up from an oil pan 2106 and sends the engine oil to an oil cooler 2103. The oil cooler 2103 is cooled by a coolant filling up a water jacket 2104. The engine oil cooled down by the oil cooler 2103 is returned to the oil pan 2106. A water pump 2105, which is also connected with the rotating part of the engine 1901, pumps the coolant up from the water jacket 2104, sends the coolant to a radiator 2101 to cool down the coolant, and returns the coolant to the water jacket 2104. The radiator 2101 is air-cooled by a cooling fan 1908 connected with the rotating part of the engine 1901.

Figure 26:
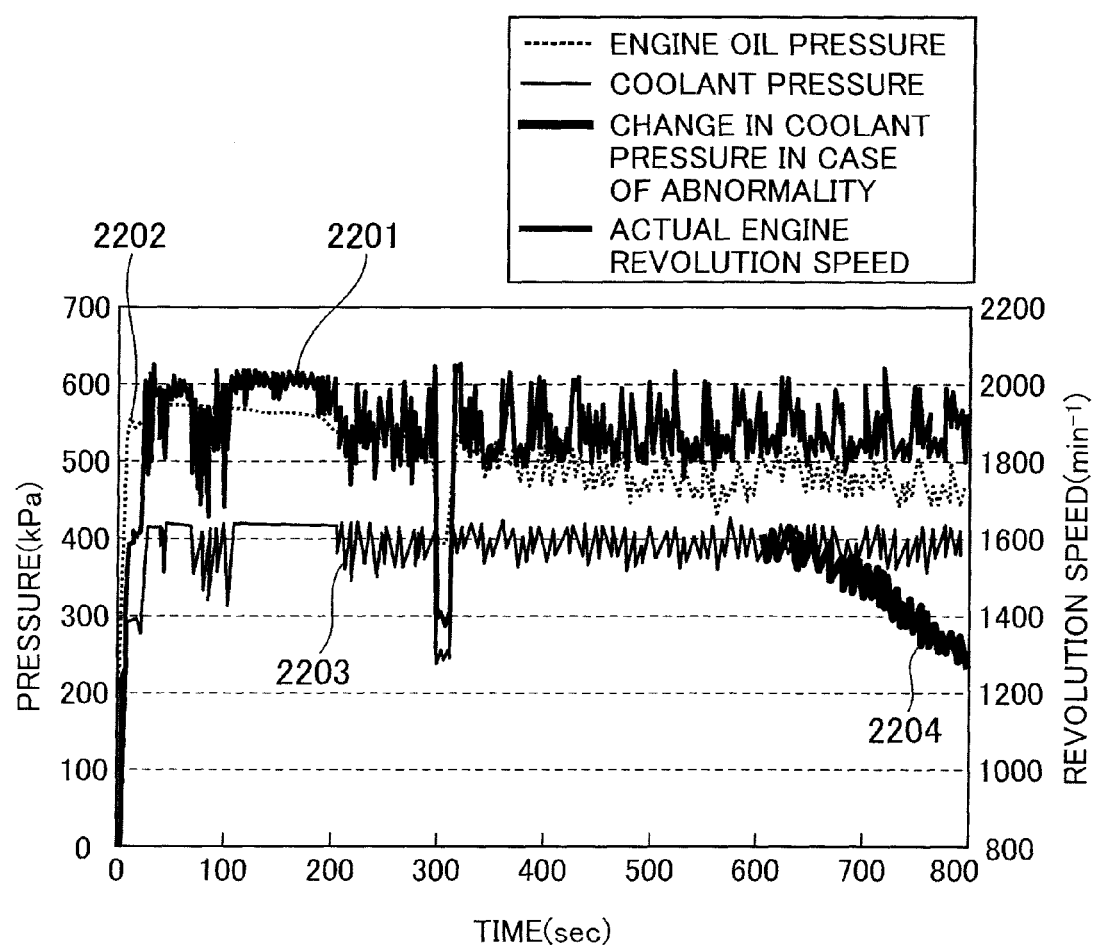
FIG. 26 is a graph showing time-variations of engine revolution speed, engine oil pressure and coolant pressure.

FIG. 26 shows time-variations of the engine revolution speed Re, engine oil pressure Pe and coolant pressure Pc. The engine oil pressure Pe (graph 2202 in FIG. 26) and the coolant pressure Pc (graph 2203 in FIG. 26) change accompanying the change in the engine revolution speed Re (graph 2201 in FIG. 26). This indicates that the oil pump 2102 and the water pump 2105 are attached to the rotating part of the engine 1901 and driven by the rotation of the engine 1901 as shown in FIG. 25.

Here, let us consider a case where the water pump 2105 failed due to some factor. The failure of the water pump 2105 brings about undesirable situations in which the circulation of the coolant is impossible or insufficient. In such cases, the coolant pressure displays unusual variations as shown in the graph 2204 in FIG. 26. This causes changes in the correlations among the engine revolution speed Re, the engine oil pressure Pe and the coolant pressure Pc.

The abnormality detecting device of this embodiment is designed based on the above idea. The abnormality detecting device detects the engine revolution speed Re, the engine oil pressure Pe and the coolant pressure Pc with a revolution speed sensor 601a, an engine oil pressure sensor 601b and a coolant pressure sensor 601c, respectively, and detects the changes in the correlation coefficients in the abnormal operation with respect to the correlation coefficients in the normal operation by use of the sensor values of the sensors 601a, 601b and 601c as inputs. By this process, an abnormality in the engine oil cooling system or the coolant cooling system (failure of the water pump 2105 in the above example) can be detected.

Also in this embodiment, correlation coefficients in different periods are used in order to acquire the correlation coefficients in the normal operation similarly to the above sixth embodiment.

Figure 27:
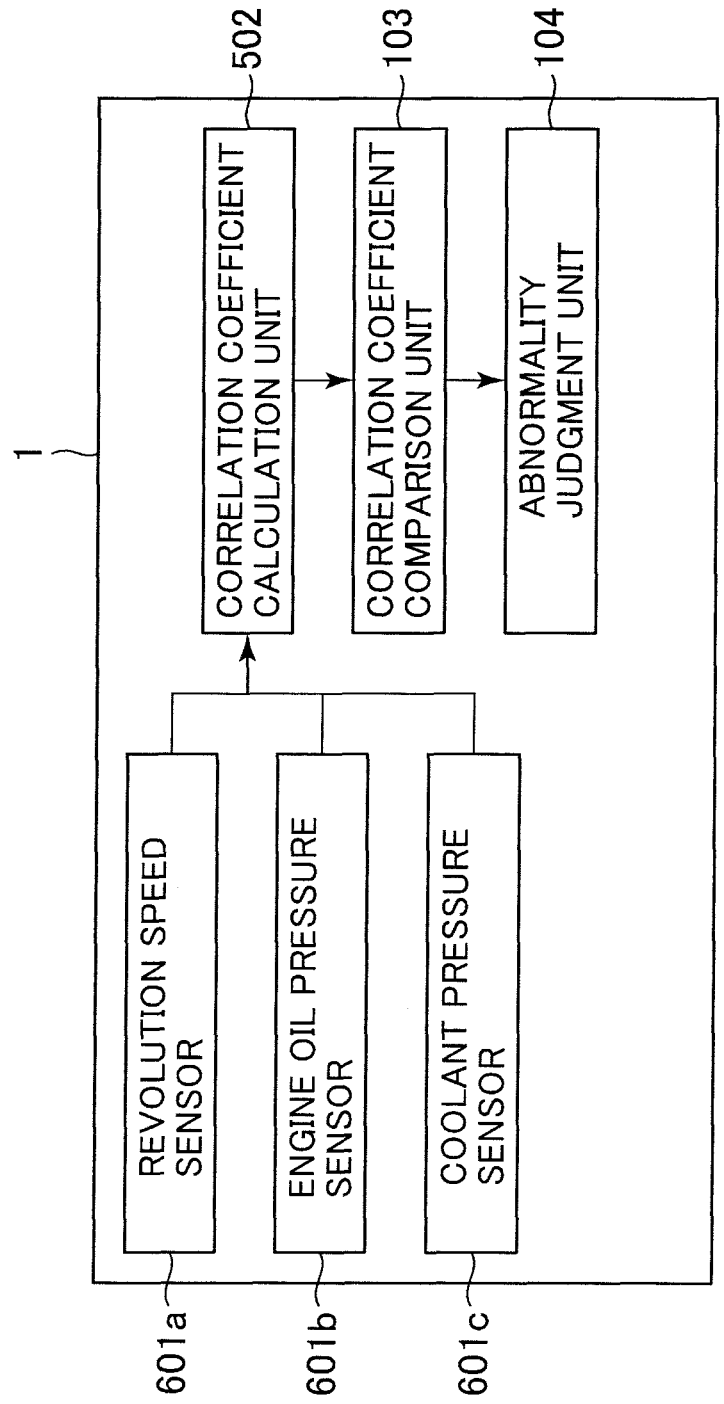
FIG. 27 is a block diagram showing the overall system configuration of an abnormality detecting device in accordance with a seventh embodiment of the present invention.

FIG. 27 is a block diagram showing the configuration of the abnormality detecting device 1 in accordance with this embodiment. The abnormality detecting device 1 of this embodiment is obtained by replacing the temperature sensors 501a, 501b, 501c and 501d in FIG. 24 with the revolution speed sensor 601a, the engine oil pressure sensor 601b and the coolant pressure sensor 601c.

The revolution speed sensor 601a, the engine oil pressure sensor 601b and the coolant pressure sensor 601c detect the engine revolution speed Re, the engine oil pressure Pe and the coolant pressure Pc, respectively.

The correlation coefficient calculation unit 502 receives the sensor signals outputted from the revolution speed sensor 601a, the engine oil pressure sensor 601b and the coolant pressure sensor 601c in each of three or more different predetermined periods and generates three or more pieces of time-series physical state information in the same periods for each sensor. Then, the correlation coefficient calculation unit 502 calculates three or more correlation coefficients from the three or more pieces of time-series physical state information regarding each sensor.

The correlation coefficient comparison unit 103 and the abnormality judgment unit 104 execute processes equivalent to those in the first embodiment, etc., by which the "warning judgment" is outputted when the percentage of the correlation comparison total is 50% or more and the "abnormality judgment" is outputted when the percentage is 80% or more.

Eighth Embodiment

Example 2 of Engine Oil Cooling System and Coolant Cooling System

Still another embodiment of the present invention will be described below referring to FIGS. 28 and 29 and the above-described embodiments. This embodiment also describes a case where correlatively changing two or more physical states are detected by a plurality of sensors as the plurality of related physical states. In this embodiment, two physical states are detected.

Figure 28:
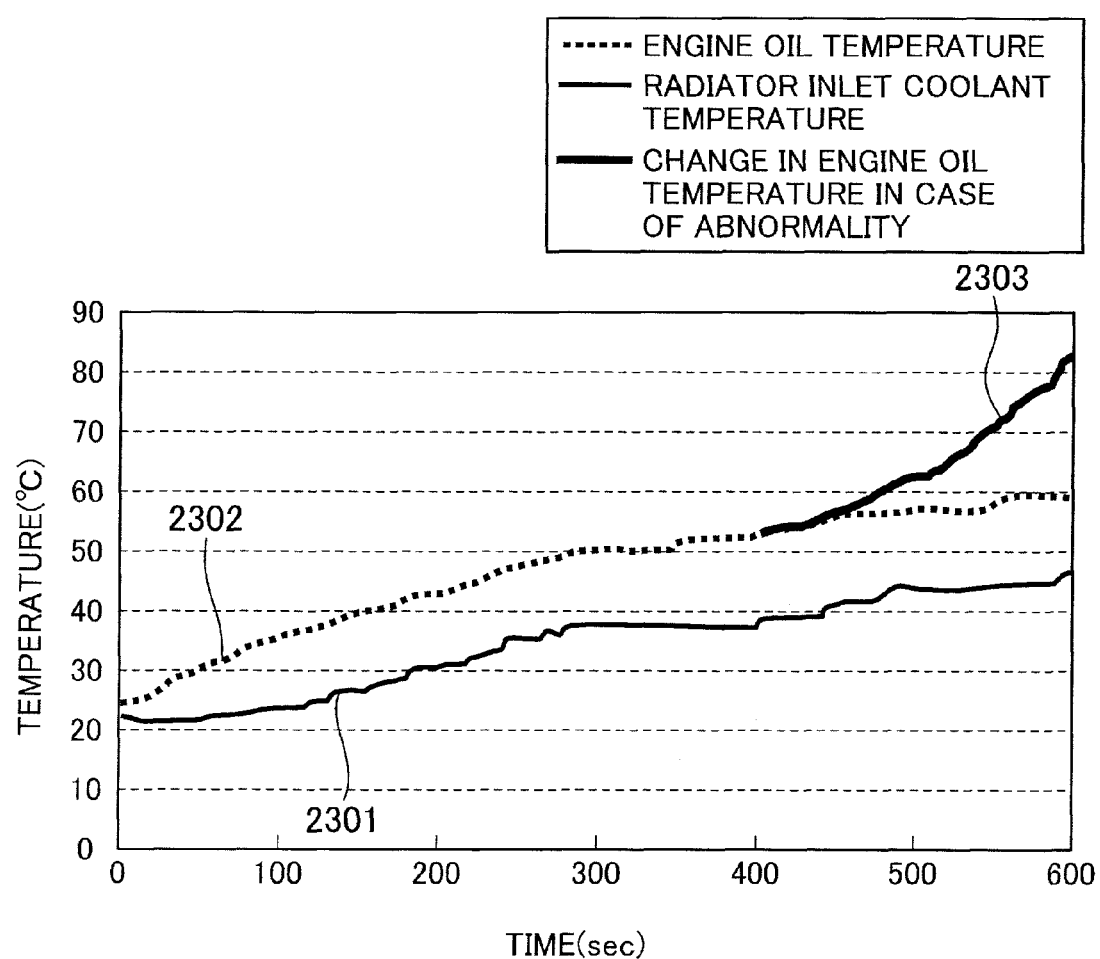
FIG. 28 is a graph showing time-variations of radiator inlet coolant temperature and engine oil temperature.

FIG. 28 is a graph showing time-variations of radiator inlet coolant temperature Tr (graph 2301 in FIG. 28) and engine oil temperature Te (graph 2302 in FIG. 28) in the engine oil cooling system and the coolant cooling system shown in FIG. 25. Referring to the radiator inlet coolant temperature Tr (graph 2301) and the engine oil temperature Te (graph 2302) shown in FIG. 28, the radiator inlet coolant temperature Tr increases with the increase in the engine oil temperature Te in the normal state. When the engine oil temperature Te increases sharply due to some kind of failure, it is possible at best to judge that an abnormality has occurred to the radiator inlet coolant temperature Tr or the engine oil temperature Te based on a change in the correlation coefficient between the two temperatures Tr and Te. When correlations among three pieces of sensor data (three physical states) are used, it is possible to determine which piece of sensor data is displaying an unusual tendency. However, when there are only two pieces of sensor data (two physical states), it is possible at best to judge that an abnormality has occurred to a part related to the two sensors.

The abnormality detecting device of this embodiment is designed based on the above idea. The abnormality detecting device detects the engine oil temperature Te and the radiator inlet coolant temperature Tr with an engine oil temperature sensor 701a and a radiator inlet coolant temperature sensor 701b, respectively, and detects the change in the correlation coefficient in the abnormal operation with respect to the correlation coefficient in the normal operation by use of the sensor values of the sensors 701a and 701b as inputs. By this process, it is possible to judge that an abnormality has occurred in the engine oil cooling system or in the coolant cooling system.

Also in this embodiment, correlation coefficients in different periods are used in order to acquire the correlation coefficient in the normal operation similarly to the sixth embodiment.

Figure 29:
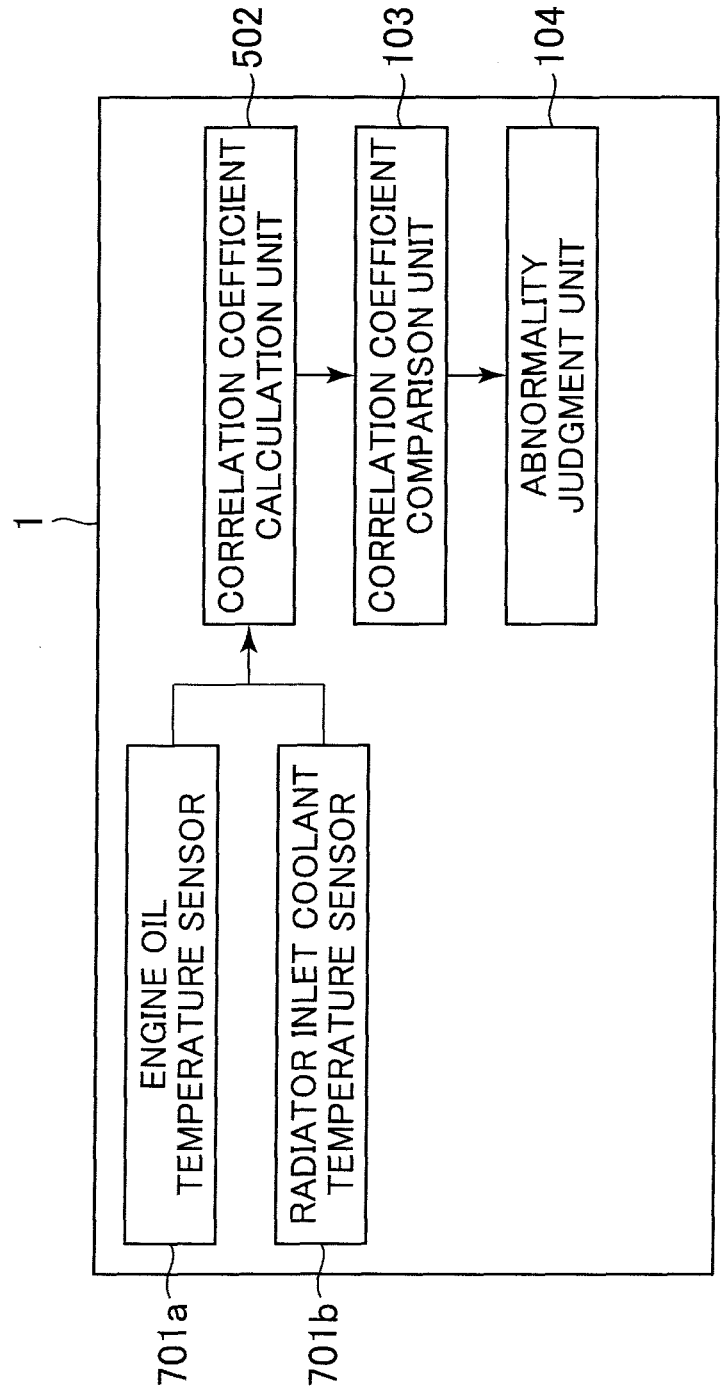
FIG. 29 is a block diagram showing the overall system configuration of an abnormality detecting device in accordance with an eighth embodiment of the present invention.

FIG. 29 is a block diagram showing the configuration of the abnormality detecting device 1 in accordance with this embodiment. The abnormality detecting device 1 of this embodiment is obtained by replacing the temperature sensors 501*a*, 501*b*, 501*c* and 501*d* in FIG. 24 with the engine oil temperature sensor 701*a* and the radiator inlet coolant temperature sensor 701*b*.

The engine oil temperature sensor 701*a* and the radiator inlet coolant temperature sensor 701*b* detect the engine oil temperature Te and the radiator inlet coolant temperature Tr, respectively.

The correlation coefficient calculation unit 502 receives the sensor signals outputted from the engine oil temperature sensor 701*a* and the radiator inlet coolant temperature sensor 701*b* in each of three different predetermined periods and generates three pieces of time-series physical state information in the same periods for each sensor. Then, the correlation coefficient calculation unit 502 calculates six correlation coefficients from the three pieces of time-series physical state information regarding each sensor.

The correlation coefficient comparison unit 103 and the abnormality judgment unit 104 execute processes equivalent to those in the first embodiment, etc., by which the "warning judgment" is outputted when the percentage of the correlation comparison total is 50% or more and the "abnormality judgment" is outputted when the percentage is 80% or more.

INDUSTRIAL APPLICABILITY

The present invention is widely applicable to various types of construction machines.

DESCRIPTION OF REFERENCE CHARACTERS

1 abnormality detecting device
101 (101*a*, 101*b*, 101*c*) sensor
102 correlation coefficient calculation unit
103 correlation coefficient comparison unit
104 abnormality judgment unit
201 (201*a*, 201*b*, 201*c*) pump case drain pressure sensor
202 operational information detecting unit
203 pump operation judgment unit
301 (301*a*, 301*b*, 301*c*) engine cylinder temperature sensor
302 revolution speed sensor
402 relative ratio calculation unit
403 relative ratio comparison unit
501*a* outside air temperature sensor
501*b* hydraulic oil temperature sensor
501*c* hydraulic oil cooler inlet temperature sensor
501*d* hydraulic oil cooler outlet temperature sensor
502 correlation coefficient calculation unit
601*a* revolution speed sensor
601*b* engine oil pressure sensor
601*c* coolant pressure sensor
701*a* engine oil temperature sensor
701*b* coolant temperature sensor
   0871, 872, 873 hydraulic cylinder
902 engine
904 hydraulic pump
906 control valve
1901 engine
1902 control valve
1903 hydraulic cylinder
1904 hydraulic oil cooler
1905 relief valve
1906 hydraulic oil tank
1907 hydraulic pump
1908 cooling fan
2101 radiator
2102 oil pump
2103 oil cooler
2104 water jacket
2105 water pump
2106 oil pan

The invention claimed is:

1. An abnormality detecting device for a construction machine equipped with a plurality of sensor means placed at a plurality of parts of the construction machine, the sensor means detecting a plurality of related physical states and outputting a plurality of pieces of sensor information, comprising:
   correlation coefficient calculation means which receives the plurality of pieces of sensor information outputted from the plurality of sensor means, generates time-series physical state information in a predetermined period on each of the plurality of pieces of sensor information corresponding to the plurality of sensor means, and calculates a plurality of correlation coefficients between separated pieces of time-series physical state information on each of the plurality of pieces of sensor information;
   correlation coefficient comparison means which compares the correlation coefficients calculated by the correlation coefficient calculation means and calculates the degree of difference of each correlation coefficient from other correlation coefficients; and
   abnormality judgment means which judges that when the degree of difference calculated by the correlation coefficient comparison means exceeds a preset value, an abnormality has occurred to a part related to the corresponding sensor means,
   wherein assuming that Xi and Xj (i,j=1, . . . , n) (n: the number of the sensor means supplying the plurality of pieces of sensor information) represent two pieces of time-series physical state information arbitrarily selected from the time-series physical state information generated by the correlation coefficient calculation means, Xi(t) and Xj(t) represent the measurement values of Xi and Xj at time t and ρ(i, j) represents the correlation coefficient between the input values Xi and Xj between time t=0 and time t=Δt(T−1) (Δt: the time between measurements, T: the number of measurements), the correlation coefficien ρ(i, j) is calculated using averages μi and μj and standard deviations σi and σj according to the following equation:

$\rho(i, j) = \Sigma(Xi(t) - \mu i)(Xj(t) - \mu j)/(T \cdot \sigma i \cdot \sigma j)$ where $\mu i = \Sigma Xi(t)/T, \mu j = \Sigma Xj(t)/T$ $\sigma i = (n\Sigma Xi(t)^2 - (\Sigma Xi(t))^2)/(T \cdot (T-1))$ $\sigma j = (n\Sigma Xj(t)^2 - (\Sigma Xj(t))^2)/(T \cdot (T-1))$.

2. The abnormality detecting device for a construction machine according to claim 1, wherein:
   the plurality of sensor means are three or more sensor means detecting three or more identical physical states as the plurality of related physical states, and
   the correlation coefficient calculation means receives three or more pieces of sensor information outputted from the three or more sensor means, generates three or more pieces of time-series physical state information in the same period and calculates the correlation coefficients from the three or more pieces of time-series physical state information.

3. The abnormality detecting device for a construction machine according to claim 1, wherein:
the plurality of sensor means are two or more sensor means detecting correlatively changing two or more physical states as the plurality of related physical states, and
the correlation coefficient calculation means receives two or more pieces of sensor information outputted from the two or more sensor means in each of three or more different periods, generates three or more pieces of time-series physical state information in the same periods for each sensor means and calculates the correlation coefficients from the three or more pieces of time-series physical state information regarding each sensor means.

4. The abnormality detecting device for a construction machine according to any one of claims 1-3, wherein the correlation coefficient comparison means determines a normalized deviation among the correlation coefficients in regard to each of the correlation coefficients calculated by the correlation coefficient calculation means and calculates the degree of difference based on the normalized deviation.

5. The abnormality detecting device for a construction machine according to any one of claims 1-3, wherein the correlation coefficient comparison means determines a normalized deviation among the correlation coefficients using an average and a standard deviation calculated from the correlation coefficients calculated by the correlation coefficient calculation means, determines a correlation comparative value as an abnormality information flag according to the absolute value of the normalized deviation, and calculates a value representing the degree of difference by totaling the correlation comparative values.

6. The abnormality detecting device for a construction machine according to claim 1 or 2, wherein:
the construction machine is equipped with a plurality of hydraulic pumps, and
the plurality of sensor means include pressure sensors being placed at the hydraulic pumps, respectively, detecting pressures of the hydraulic pumps and outputting pressure information, and
when the degree of difference calculated by the correlation coefficient comparison means in regard to a correlation coefficient exceeds a preset value, the abnormality judgment means judges that an abnormality has occurred to a hydraulic pump related to a pressure sensor corresponding to the correlation coefficient.

7. The abnormality detecting device for a construction machine according to claim 6, further comprising:
operational information detecting means which detects operational information on the construction machine; and
hydraulic pump operation judgment means which judges operating status of each hydraulic pump based on the operational information,
wherein the correlation coefficient calculation means calculates the correlation coefficients using the pressure information on hydraulic pumps that are in operation only, based on result of the judgment by the operation judgment means.

8. The abnormality detecting device for a construction machine according to claim 1 or 2, wherein:
the construction machine is equipped with an engine having a plurality of cylinders, and
the plurality of sensor means include temperature sensors being placed at the engine's cylinders, respectively, detecting temperatures of the cylinders and outputting temperature information,
when the degree of difference calculated by the correlation coefficient comparison means in regard to a temperature sensor exceeds a preset value, the abnormality judgment means judges that an abnormality has occurred to a cylinder related to the temperature sensor.

9. The abnormality detecting device for a construction machine according to claim 8, further comprising revolution speed detecting means which detects engine revolution speed of the engine,
wherein the correlation coefficient calculation means calculates the correlation coefficients using the temperature information acquired only when the engine revolution speed detected by the revolution speed detecting means is a predetermined value or more.

10. The abnormality detecting device for a construction machine according to claim 1 or 3, wherein:
the construction machine includes:
an engine;
a hydraulic pump which is driven by the engine, pumps hydraulic oil up from a tank and discharges the hydraulic oil;
a hydraulic actuator which is driven by the hydraulic oil discharged from the hydraulic pump and supplied via a control valve; and
a hydraulic oil cooling device which cools down the hydraulic oil being returned from the hydraulic actuator to the tank via the control valve, and the hydraulic oil cooling device includes:
a hydraulic oil cooler which is placed on a path returning the hydraulic oil to the tank and cools down the hydraulic oil; and
a cooling fan which cools down the hydraulic oil cooler, and the plurality of sensor means include:
a first temperature sensor which detects outside air temperature;
a second temperature sensor which detects temperature of the hydraulic oil in the tank;
a third temperature sensor which detects temperature of the hydraulic oil on the inlet side of the hydraulic oil cooler; and
a fourth temperature sensor which detects temperature of the hydraulic oil on the outlet side of the hydraulic oil cooler, and
when the degree of difference calculated by the correlation coefficient comparison means in regard to a temperature sensor exceeds a preset value, the abnormality judgment means judges that an abnormality has occurred to a part of the hydraulic oil cooling device related to the temperature sensor.

11. The abnormality detecting device for a construction machine according to claim 1 or 3, wherein:
the construction machine includes:
an engine;
an engine oil cooling system including an oil pump which is driven by the engine, pumps engine oil up from an oil pan, discharges the engine oil and circulates the engine oil in the engine, and an oil cooler which is placed on a path returning the engine oil after circulating in the engine to the oil pan and cools down the engine oil; and
a coolant cooling system including a water jacket which cools the oil cooler, a water pump which is driven by the engine and supplies coolant to the water jacket, a radiator which is placed on a path returning the coolant after passing through the water jacket to the water pump and cools down the coolant, and a cooling fan which is driven by the engine and cools down the radiator, and the plurality of sensor means include:
- a revolution speed sensor which detects engine revolution speed of the engine;
- a first pressure sensor which detects pressure of the engine oil discharged from the oil pump; and
- a second pressure sensor which detects pressure of the coolant discharged from the water pump, and the correlation coefficient calculation means calculates correlation coefficients between each of engine revolution speed information outputted from the revolution speed sensor, first pressure information outputted from the first pressure sensor and second pressure information outputted from the second pressure sensor and other pieces of information, and the correlation coefficient comparison means calculates the degrees of difference by comparing the correlation coefficients calculated by the correlation coefficient calculation means, and when the degree of difference calculated by the correlation coefficient comparison means in regard to a sensor means exceeds a preset value, the abnormality judgment means judges that an abnormality has occurred to a component related to the sensor means.

12. The abnormality detecting device for a construction machine according to claim 1 or 3, wherein:

the construction machine includes:
- an engine;
- an engine oil cooling system including an oil pump which is driven by the engine, pumps engine oil up from an oil pan, discharges the engine oil and circulates the engine oil in the engine, and an oil cooler which is placed on a path returning the engine oil after circulating in the engine to the oil pan and cools down the hydraulic oil; and
- a coolant cooling system including a water jacket which cools the oil cooler, a water pump which is driven by the engine and supplies coolant to the water jacket, a radiator which is placed on a path returning the coolant after passing through the water jacket to the water pump and cools down the coolant, and a cooling fan which is driven by the engine and cools down the radiator, and the plurality of sensor means include:
- a first temperature sensor which detects temperature of the engine oil; and
- a second temperature sensor which detects temperature of the coolant, and when the degree of difference calculated by the correlation coefficient comparison means in regard to a temperature sensor exceeds a preset value, the abnormality judgment means judges that an abnormality has occurred to the engine oil cooling system or the coolant cooling system that is related to the temperature sensor.

13. The abnormality detecting device for a construction machine according to claim 1, wherein:

the abnormality detecting device comprises relative ratio calculation means which calculates relative ratios between separated pieces of time-series physical state information in regard to each piece of time-series physical state information regarding each piece of sensor information and relative ratio comparison means which compares the relative ratios calculated by the relative ratio calculation means and calculates the degree of difference between each relative ratio and other relative ratios in place of the correlation coefficient calculation means and the correlation coefficient comparison means, and when the degree of difference calculated by the correlation coefficient comparison means in regard to a sensor means exceeds a preset value, the abnormality judgment means judges that an abnormality has occurred to a part related to the sensor means.

* * * * *